US009183408B2

(12) United States Patent
Ito

(10) Patent No.: US 9,183,408 B2
(45) Date of Patent: Nov. 10, 2015

(54) INFORMATION MONITORING APPARATUS AND INFORMATION MONITORING METHOD

(75) Inventor: Naoko Ito, Tokyo (JP)

(73) Assignee: NEC CORPORATION, Tokyo (JP)

(*) Notice: Subject to any disclaimer, the term of this patent is extended or adjusted under 35 U.S.C. 154(b) by 68 days.

(21) Appl. No.: 14/006,813

(22) PCT Filed: Feb. 20, 2012

(86) PCT No.: PCT/JP2012/054674
§ 371 (c)(1),
(2), (4) Date: Sep. 23, 2013

(87) PCT Pub. No.: WO2012/127987
PCT Pub. Date: Sep. 27, 2012

(65) Prior Publication Data
US 2014/0013442 A1  Jan. 9, 2014

(30) Foreign Application Priority Data
Mar. 24, 2011  (JP) .................................. 2011-066206

(51) Int. Cl.
*G06F 21/62* (2013.01)
(52) U.S. Cl.
CPC .................................. *G06F 21/6245* (2013.01)
(58) Field of Classification Search
CPC ......... G06F 21/10; G06F 21/60; G06F 21/62; G06F 21/6218; G06F 21/6245; G06Q 40/08; G06Q 50/265; G11B 20/00086
USPC ...................... 726/27; 705/1.1, 317, 318, 325
See application file for complete search history.

(56) References Cited

U.S. PATENT DOCUMENTS 7,058,680 B2*   6/2006 Mito et al. ............... 709/201
2008/0034439 A1*  2/2008 Chen et al. ............... 726/27
(Continued)

FOREIGN PATENT DOCUMENTS

| JP | 2000-078182 A | 3/2000 |
| JP | 2000078182 | * 3/2000 |
| JP | 2001-005833 A | 1/2001 |
| JP | 2006-031578 A | 2/2006 |

OTHER PUBLICATIONS

Swart et al., "On the viability of pro-active automated PII breach detection: A South African case study", 2014, ACM, pp. 251-259.*

(Continued)

*Primary Examiner* — Matthew Smithers
(74) *Attorney, Agent, or Firm* — Sughrue Mion, PLLC

(57) ABSTRACT

The present invention provides an information monitoring apparatus and an information monitoring method which make it possible to prevent personal information from being acquired by a disclosure requester for the purpose of an unfair use thereof. The information monitoring apparatus includes: a means for storing therein acquired attribute information corresponding to at least one acquired attribute which has already been acquired by an acquisitor, a means for, on the basis of the acquired attribute information and disclosed attribute information corresponding to a disclosed attribute targeted for disclosure to the acquisitor, determining whether or not attribute synthetic information resulting from synthesizing the acquired attribute and the disclosed attribute satisfies each of predetermined one or more determination conditions, and a means for executing predetermined protection processing on an attribute on the basis of the result of the determination.

15 Claims, 27 Drawing Sheets

(56) References Cited

U.S. PATENT DOCUMENTS

2008/0046748 A1* 2/2008 Fujimoto ................ 713/182
2009/0089094 A1* 4/2009 Stockton et al. ............ 705/3
2009/0300716 A1* 12/2009 Ahn ......................... 726/1
2011/0252456 A1* 10/2011 Hatakeyama ............... 726/1
2012/0197873 A1* 8/2012 Uramoto et al. ........... 707/722

OTHER PUBLICATIONS

International Search Report for PCT/JP2012/054674, dated Mar. 19, 2012.

* cited by examiner

Fig.3

141 ACQUIRED ATTRIBUTE INFORMATION TABLE

| 143 ACQUISITOR IDENTIFICATION INFORMATION | 144 SUBJECT IDENTIFICATION INFORMATION | 145 ATTRIBUTE IDENTIFICATION INFORMATION | 146 ATTRIBUTE | 142 ACQUIRED ATTRIBUTE INFORMATION |
|---|---|---|---|---|
| RID1 | SID1 | PID11 | GENDER, MALE | |
| RID1 | SID1 | PID12 | CURRENT LOCATION, 47. 123456:135. 123456 | |
| RID1 | SID1 | PID13 | OCCUPATION, STUDENT | |
| RID1 | SID1 | PID12 | CURRENT LOCATION, 47. 123456:136. 123455 | |
| ... | ... | ... | ... | |

Fig.6

141 ACQUIRED ATTRIBUTE INFORMATION TABLE

| 143 ACQUISITOR IDENTIFICATION INFORMATION | 144 SUBJECT IDENTIFICATION INFORMATION | 145 ATTRIBUTE IDENTIFICATION INFORMATION | 146 ATTRIBUTE |
|---|---|---|---|
| RID1 | SID1 | PID11 | AGE, TWENTY-ONE YEARS OLD |
| RID1 | SID1 | PID12 | CURRENT LOCATION, 47. 123456:135. 123456 |
| RID1 | SID1 | PID13 | OCCUPATION, STUDENT |
| RID1 | SID1 | PID12 | CURRENT LOCATION, 47. 123456:136. 123455 |
| ... | ... | ... | ... |
| ... | ... | ... | ... |

142 ACQUIRED ATTRIBUTE INFORMATION

Fig. 13

241 ACQUIRED ATTRIBUTE IDENTIFICATION TABLE

242 ACQUIRED ATTRIBUTE INFORMATION

| 143 ACQUISITOR IDENTIFICATION INFORMATION | 144 SUBJECT IDENTIFICATION INFORMATION | 145 ATTRIBUTE IDENTIFICATION INFORMATION | 247 ATTRIBUTE NAME | 249 GRANULARITY LEVEL |
|---|---|---|---|---|
| RID1 | SID1 | PID11 | GENDER | 1 |
| RID1 | SID1 | PID12 | CURRENT LOCATION | 1 |
| RID1 | SID1 | PID13 | OCCUPATION | 1 |
| RID1 | SID1 | PID12 | CURRENT LOCATION | 0.5 |
| ... | ... | ... | ... | ... |

335 PREDICTED ATTRIBUTE INFORMATION

AGE, CURRENT LOCATION

Fig.18

| GENDER, CURRENT LOCATION, OCCUPATION | AGE |
|---|---|
| CURRENT LOCATION, CURRENT LOCATION | CURRENT LOCATION |
| : : | : : |
| : : | : : |

333 ALREADY ACQUIRED INFORMATION
334 PREDICTION INFORMATION
332 TENDENCY INFORMATION

Fig.20

341 ACQUIRED ATTRIBUTE INFORMATION TABLE

143 ACQUISITOR IDENTIFICATION INFORMATION
144 SUBJECT IDENTIFICATION INFORMATION
145 ATTRIBUTE IDENTIFICATION INFORMATION
346 ATTRIBUTE
342 ACQUIRED ATTRIBUTE INFORMATION
349 GRANULARITY LEVEL

| | | | | |
|---|---|---|---|---|
| RID1 | SID1 | PID11 | GENDER, MALE | 1 |
| RID1 | SID1 | PID12 | CURRENT LOCATION, 47. 123456:135. 123456 | 1 |
| RID1 | SID1 | PID13 | OCCUPATION, STUDENT | 1 |
| RID1 | SID1 | PID12 | CURRENT LOCATION, 47. 12345:136. 12345 | 0.5 |
| ... | ... | ... | ... | ... |

451 ANONYMITY DEGREE DETERMINATION TABLE

454 ANONYMITY DEGREE

452 ANONYMITY DEGREE INFORMATION

| 453 ATTRIBUTE NAME GROUP | |
|---|---|
| GENDER, CURRENT LOCATION, OCCUPATION | 2 |
| GENDER, CURRENT LOCATION, AGE | 3 |
| GENDER, CURRENT LOCATION, USED CAREER | 3 |
| GENDER, CURRENT LOCATION, OCCUPATION, AGE | 1 |
| ... | ... |
| ... | ... |

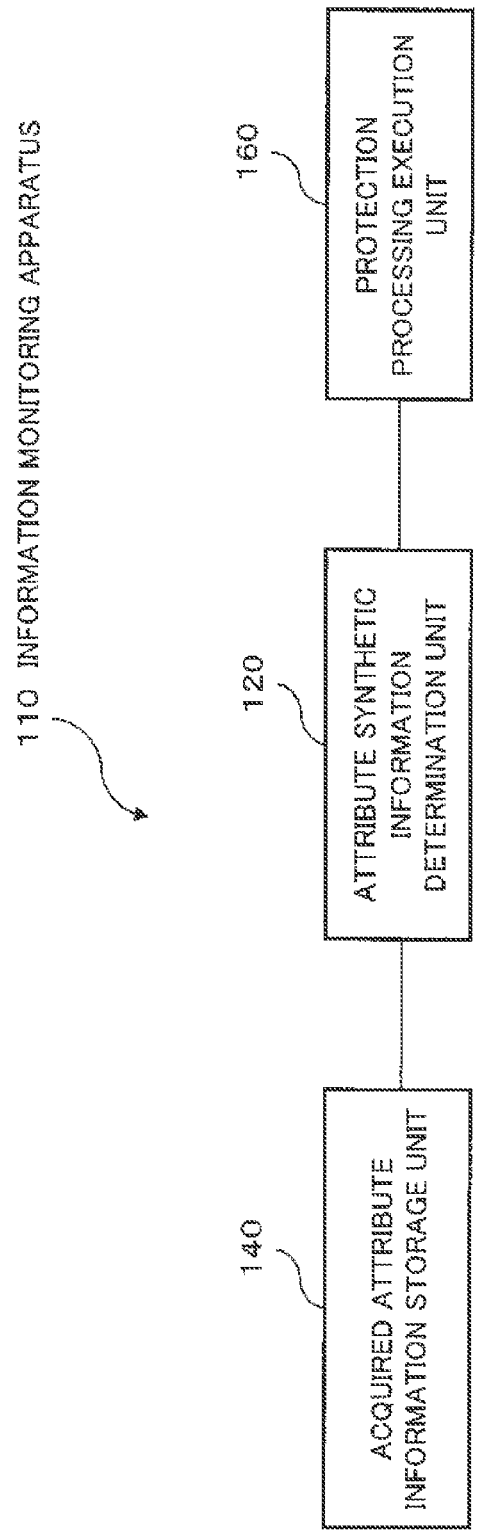

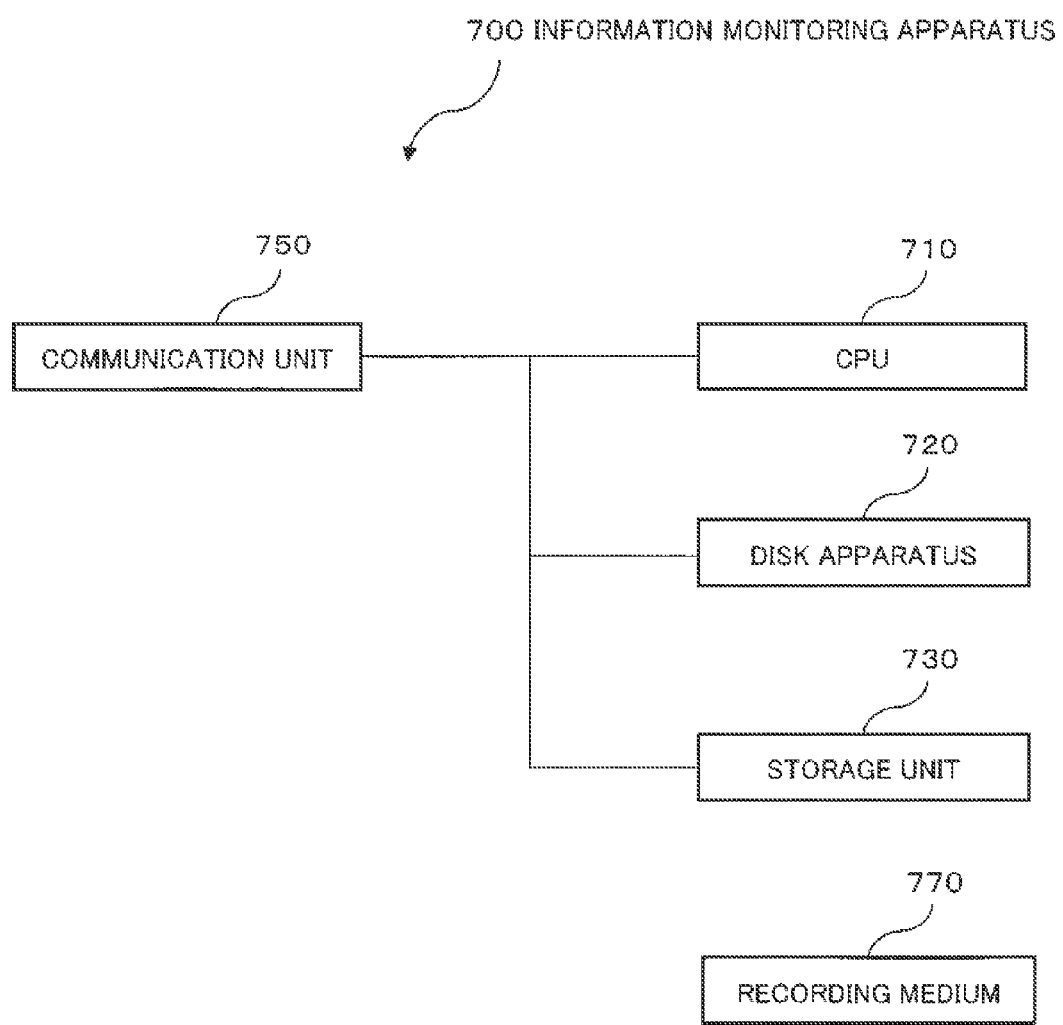

INFORMATION MONITORING APPARATUS AND INFORMATION MONITORING METHOD

TECHNICAL FIELD

The present invention relates to an information monitoring apparatus, an information monitoring method and a program, and in particular it relates to an information monitoring apparatus, an information monitoring method and a program which monitor disclosure of information.

BACKGROUND ART

Various related technologies for monitoring and controlling disclosure of personal information and attribute information have been known.

For example, in patent literature (PTL) 1, a personal information management server has been disclosed. The personal information management server disclosed in PTL 1 includes a personal information accumulation unit, a disclosure policy accumulation unit and a personal information disclosure control unit.

The personal information accumulation unit accumulates pieces of personal information.

The disclosure policy accumulation unit accumulates personal information disclosure policies in each of which disclosure conditions for use in determination of a disclosure propriety regarding the personal information are prescribed.

The personal information disclosure control unit receives a request for disclosure of a piece of personal information regarding one of predetermined users (subjects possessing respective pieces of personal information accumulated in the personal information accumulation unit) from a disclosure requester's terminal. When having received the request for disclosure thereof, subsequently, the personal information disclosure control unit retrieves a personal information disclosure policy corresponding to the predetermined user from the disclosure policy accumulation unit. Subsequently, the personal information disclosure control unit determines a disclosure propriety regarding a piece of personal information corresponding to the request for disclosure on the basis of the retrieved personal information disclosure policy. In the case where the determination regarding the disclosure propriety results in that the disclosure is approved, subsequently, the personal information disclosure control unit transmits the piece of personal information regarding the predetermined user, which is accumulated in the personal information accumulation unit, to the disclosure requester's terminal. In contrast, in the case where the determination regarding the disclosure propriety results in that the disclosure is disapproved, the personal information disclosure control unit transmits a disclosure disapproval notification to the disclosure requester's terminal.

[Patent Literature]

[Patent Literature 1] Japanese Patent Application Publication No. 2006-031578

SUMMARY OF INVENTION

Problem to be Solved by the Invention

In this regard, however, in the above-described technology disclosed in PTL 1, there has been a problem that it is difficult to prevent personal information (its attribute may be included therein) from being acquired by a disclosure requester for the purpose of an unfair use thereof.

A reason why it is difficult to prevent personal information from an acquisition for the purpose of an unfair use thereof is that the personal information management server in PTL 1 determines the disclosure propriety on the basis of only disclosure conditions corresponding to a single piece of personal information.

Hereinafter, reasons for this will be specifically described.

A disclosure requester integrates plurality pieces of personal information and has an intention of using the integrated pieces of personal information for a purpose other than purposes having been approved by users thereof and the personal information management server.

On the other hand, it is difficult for the personal information management server in PTL 1 to be aware of such an intention. Further, when having received a request for disclosure of a piece of personal information from this disclosure requester, the personal information management server in PTL 1 determines a disclosure propriety on the basis of only disclosure conditions corresponding the single piece of personal information.

Accordingly, this disclosure requester can acquire the plurality pieces of personal information from plurality of information providers or in a repeated manner, so as not to violate any disclosure condition corresponding to the single piece of personal information. Further, this disclosure requester can integrate the acquired a plurality pieces of personal information and use the integrated pieces of personal information for the purpose other than purposes which have been approved by users thereof and the personal information management server.

An object of the present invention is to provide an information monitoring apparatus, an information monitoring method and a program which make it possible to solve the aforementioned problem.

Means for Solving a Problem

An information monitoring apparatus according to a first aspect of the present invention includes:

acquired attribute information storage means for storing therein a piece of acquired attribute information corresponding to a acquired attribute which has already been acquired by an acquisitor;

acquisition state determination means for, on the basis of said piece of acquired attribute information and a piece of disclosed attribute information corresponding to a disclosed attribute which is a target for disclosure to said acquisitor, determining whether or not a piece of attribute synthetic information resulting from synthesizing said acquired attribute and said disclosed attribute satisfies each of predetermined one or more determination conditions, and outputting a result of said determination; and protection processing execution means for executing predetermined protection processing on an attribute on the basis of said result of said determination.

An information monitoring method, according to a second aspect of the present invention, for use in an information monitoring apparatus including storage means, the information monitoring method includes:

storing, in said storage means, a piece of acquired attribute information corresponding to a acquired attribute which has already been acquired by an acquisitor;

on the basis of said piece of acquired attribute information and a piece of disclosed attribute information corresponding to a disclosed attribute which is a target for disclosure to said acquisitor, determining whether or not a piece of attribute synthetic information resulting from synthesizing said acquired attribute and said disclosed attribute satisfies each of predetermined one or more determination conditions, and outputting a result of said determination; and executing predetermined protection processing on an attribute on the basis of said result of said determination.

A non-transitory computer-readable recording medium, according to a third aspect of the present invention, for recording a program which causes a computer including storage means to execute comprising the processes of:

storing, in said storage means, a piece of acquired attribute information corresponding to a acquired attribute which has already been acquired by an acquisitor;

on the basis of said piece of acquired attribute information and a piece of disclosed attribute information corresponding to a disclosed attribute which is a target for disclosure to said acquisitor, determining whether or not a piece of attribute synthetic information resulting from synthesizing said acquired attribute and said disclosed attribute satisfies each of predetermined one or more determination conditions, and outputting a result of said determination; and executing predetermined protection processing on an attribute on the basis of said result of said determination.

Effect of the Invention

The present invention has an advantageous effect of making it possible to prevent personal information from being acquired by a disclosure requester for the purpose of an unfair use thereof.

BRIEF DESCRIPTION OF THE DRAWINGS

FIG. 3 is a diagram illustrating an example of an acquired attribute information table in the first exemplary embodiment.

FIG. 6 is a diagram illustrating an example of an acquired attribute information table in the first exemplary embodiment.

FIG. 13 is a diagram illustrating an example an acquired attribute information table in the second exemplary embodiment.

FIG. 18 is a diagram illustrating an example of tendency information in the fourth exemplary embodiment.

FIG. 20 is a diagram illustrating an example of an acquired attribute information table in the fourth exemplary embodiment.

FIG. 26 is a block diagram illustrating a configuration of a seventh exemplary embodiment.

FIG. 27 is a block diagram illustrating a configuration of an information monitoring apparatus which causes a computer to execute predetermined processing by using a program, in the seventh exemplary embodiment.

EXEMPLARY EMBODIMENTS FOR CARRYING OUT OF THE INVENTION

Hereinafter, exemplary embodiments of the present invention will be described in detail with reference to drawings.

<First Exemplary Embodiment>

Figure 1:
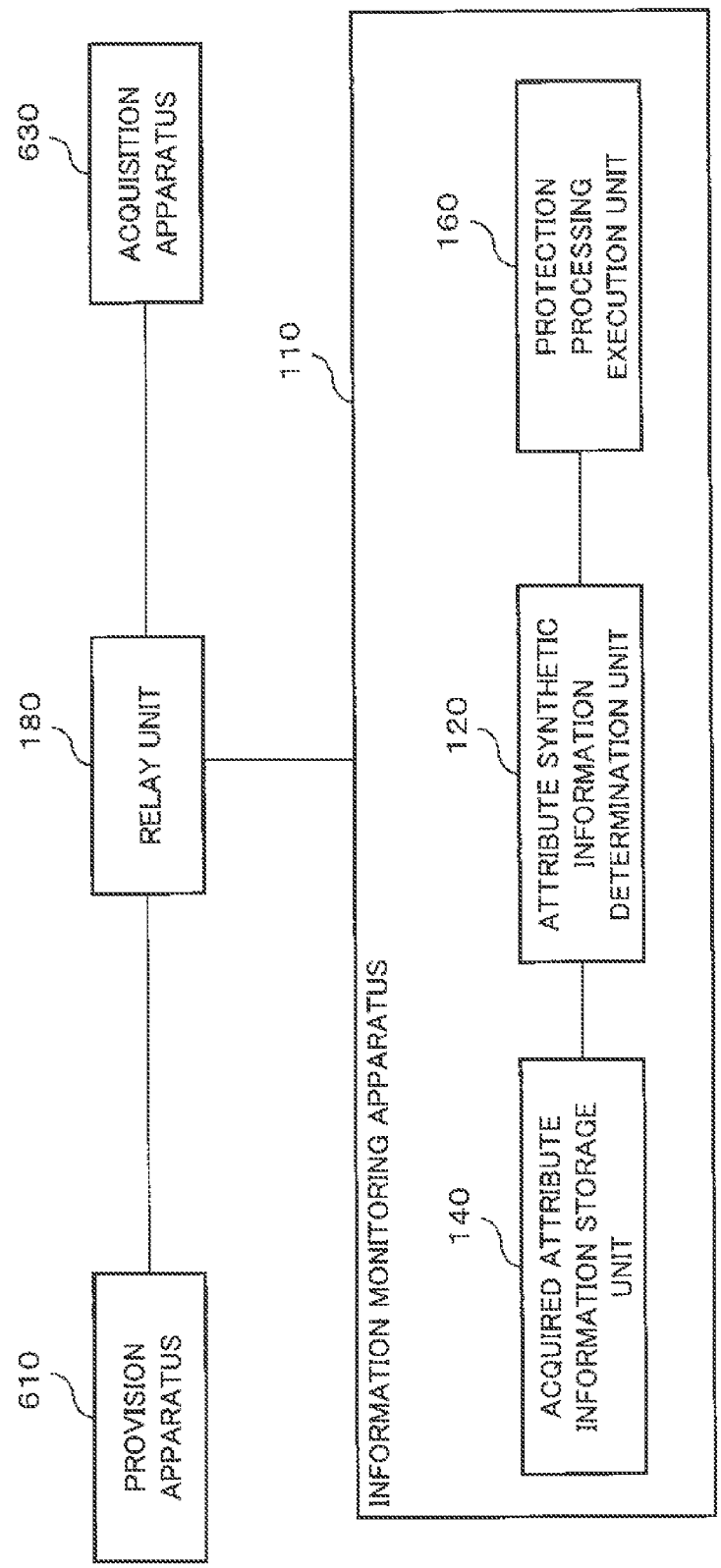
FIG. 1 is a block diagram illustrating a configuration of a first exemplary embodiment.

FIG. 1 is a block diagram illustrating a configuration of a first exemplary embodiment. Referring to FIG. 1, this exemplary embodiment includes a provision apparatus 610, an acquisition apparatus (also referred to as an acquisitor) 630, a relay unit 180 and an information monitoring apparatus 110. The provision apparatus 610 and the relay unit 180 are connected to each other via a network which is not illustrated. Further, the acquisition apparatus 630 and the relay unit 180 are connected to each other via a network which is not illustrated. Moreover, the information monitoring apparatus 110 and the relay unit 180 are connected to each other via a network which is not illustrated. In addition, with respect to each of the provision apparatus 610, the acquisition apparatus 630 and the relay unit 180, there may exist an arbitrary number of apparatuses or units.

The acquisition apparatus 630 transmits an attribute request to the relay unit 180, and receives a piece of response information which is transmitted from the relay unit 180 as a response thereto.

Here, the attribute request is a piece of information for specifying a requested target attribute. Further, the attribute request includes, for example, a piece of acquisitor identification information, as well as a piece of subject identification information and an attribute name which correspond to the requested target attribute. Further, the attribute request may be configured such that, for example, the piece of acquisitor identification information and a piece of attribute identification information which are included therein specify the requested target attribute. Moreover, the attribute request may be configured so as to specify a plurality of attributes.

The attribute is a piece of information including an attribute name (for example, gender) and an attribute value (for example, a male), and indicates nature, a characteristic or the like information which is possessed by a specific subject (for example, a person A).

The piece of attribute identification information is a piece of identification information for identifying each of attributes (for example, an attribute which is possessed by a person A and which includes a 'current location' as an attribute name thereof). In addition, there is also a case where the piece of attribute identification information indicates the attribute name (that is, the attribute name is called the piece of attribute identification information by itself).

The piece of acquisitor identification information is a piece of identification information for identifying an acquisitor (for example, a service provider B) which acquires a relevant attribute by operating the acquisition apparatus 630 (the above piece of identification information being referred to as, for example, a user identifier B). The piece of subject identification information is a piece of identification information for identifying a subject (for example, a person A) which possesses a relevant attribute (the above piece of identification information being referred to as, for example, a user identifier A).

Further, the piece of response information corresponds to, for example, each of the requested attributes, and includes any one of an attribute which is the requested attribute, a processed attribute and a provision disapproval notification. The processed attribute is an attribute whose attribute value has been processed (for example, a granularity level thereof has been roughened). The provision disapproval notification is a piece of information indicating that a relevant attribute which has been requested by the attribute request is not provided.

In addition, the acquisition apparatus 630 may be configured so as to transmit the attribute request to the provision apparatus 610. In this case, the acquisition apparatus 630 and the provision apparatus 610 are connected to each other via a network which is not illustrated.

Figure 2:
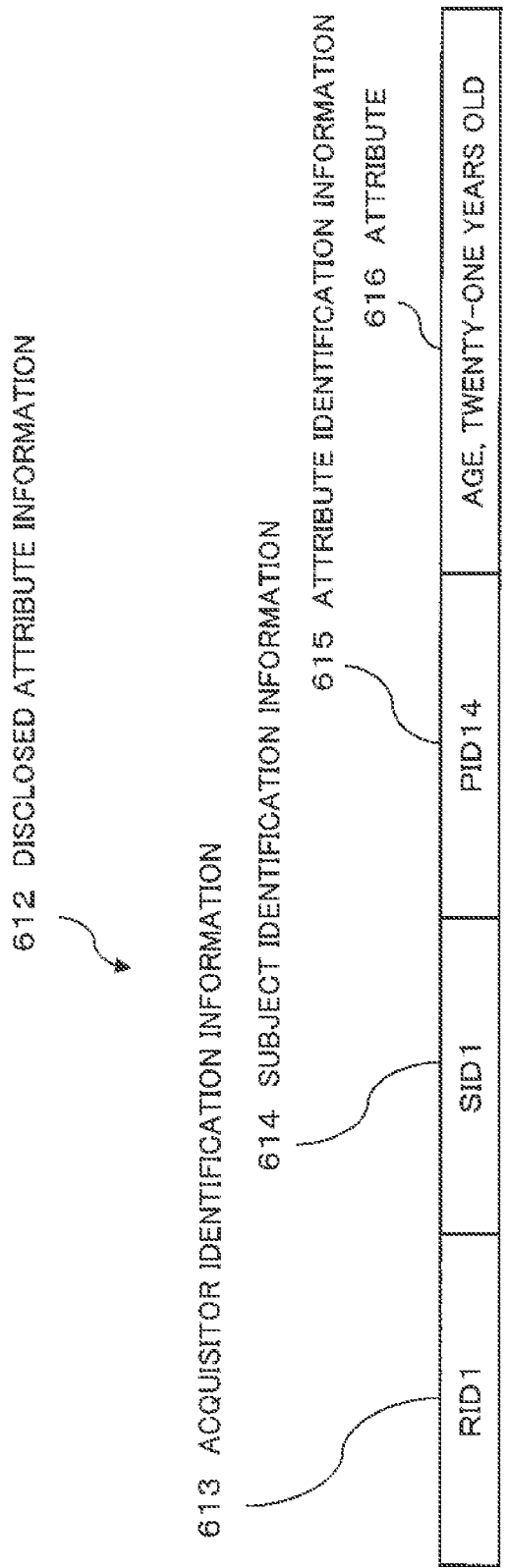
FIG. 2 is a diagram illustrating an example of disclosed attribute information in the first exemplary embodiment.

The provision apparatus 610 receives the attribute request, and, in response thereto, transmits a piece of disclosed attribute information to the relay unit 180. FIG. 2 is a diagram illustrating an example of the piece of disclosed attribute information. As shown in FIG. 2, a piece of disclosed attribute information 612 includes an attribute (also referred to as a disclosed attribute) 616 having been requested by a relevant attribute request, a piece of attribute identification information 615 for the attribute, a piece of acquisitor identification information 613 corresponding to the relevant attribute request and a piece of subject identification information 614 corresponding to the relevant attribute request. In addition, the piece of disclosed attribute information 612 includes the attribute 616 in the form of, for example, 'an attribute name and an attribute value'.

In addition, when having received the attribute request from the acquisition apparatus 630, the provision apparatus 610 also transmits the piece of disclosed attribute information 612 to the relay unit 180.

The relay unit 180 receives the attribute request having been transmitted by the acquisition apparatus 630, and transmits the received attribute request to the provision apparatus 610. Further, the relay unit 180 receives the piece of disclosed attribute information 612 having been transmitted by the provision apparatus 610, and transmits the received piece of disclosed attribute information 612 to the information monitoring apparatus 110. Moreover, the relay unit 180 receives the piece of response information from the information monitoring apparatus 110, and transmits the received piece of response information to the acquisition apparatus 630.

The information monitoring apparatus 110 includes an acquired attribute information storage unit 140, an attribute synthetic information determination unit 120 and a protection processing execution unit 160.

The acquired attribute information storage unit 140 stores therein one or more pieces of acquired attribute information corresponding to respective one or more acquired attributes which have been already acquired by acquisitors which acquire attributes. Specifically, the acquired attribute information storage unit 140 stores therein, as acquired pieces of attribute information, histories of respective pieces of disclosed attribute information 612 which are among the pieces of disclosed attribute information 612 having been received by the information monitoring apparatus 110, and which correspond to attributes (acquired attributes) having been transmitted by the information monitoring apparatus 110 as the pieces of response information. FIG. 3 is a diagram illustrating an example of an acquired attribute information table 141 stored by the acquired attribute information storage unit 140.

As shown in FIG. 3, the acquired attribute information table 141 includes one or more pieces of acquired attribute information 142. The piece of acquired attribute information 142 includes the piece of acquisitor identification information 613, the piece of subject identification information 614, the piece of attribute identification information 615 and the attribute 616, which are included in the piece of disclosed attribute information 612, as a piece of acquisitor identification information 143, a piece of subject identification information 144, a piece of attribute identification information 145 and an attribute 146 (the acquired attribute), respectively.

The attribute synthetic information determination unit 120 determines, on the basis of the pieces of acquired attribute information 142 and the specific piece of disclosed attribute information 612, whether or not a piece of attribute synthetic information, which is obtained by synthesizing the acquired attributes and the disclosed attribute, satisfies each of one or more predetermined determination conditions. Subsequently, the attribute synthetic information determination unit 120 outputs the determination result to the protection processing execution unit 160. Here, the specific piece of disclosed attribute information 612 is a piece of disclosed attribute information 612 which corresponds to a disclosed attribute targeted for disclosure to an acquisitor which has already acquired at least one acquired attribute. The piece of disclosed attribute information 612 corresponding to a disclosed attribute targeted for disclosure to an acquisitor which has already acquired at least one acquired attribute is the piece of disclosed attribute information 612 having been received from the relay unit 180. Further, the piece of attribute synthetic information is a piece of information which, in the case where the acquisition apparatus 630, which has retained the acquired attribute, will have acquired the disclosed attribute, indicates a synthetic acquisition state of the attribute in the acquisition apparatus 630.

Here, an example of the determination conditions will be described.

Hereinafter, the piece of acquired attribute information 142, which includes the piece of acquisitor identification information 143 and the piece of subject identification information 144 which are matched with the piece of acquisitor identification information 613 and the piece of subject identification information 614, respectively, which are included in the piece of disclosed attribute information 612, will be referred to as a piece of subject matched attribute information.

For example, the determination condition is such that the number of the pieces of subject matched attribute information is larger than or equal to a predetermined threshold value (for example, '5').

Further, for example, the determination condition may be such that the number of kinds of attribute name regarding both the attributes 146 included in the respective pieces of subject matched attribute information and the attribute 616 included in the piece of disclosed attribute information 612 is larger than a predetermined threshold value (for example, '4').

Further, for example, the determination condition may be such that the number of specific pieces of acquired attribute information 142 is larger than or equal to a predetermined threshold value (for example, '3'). Here, the specific piece of acquired attribute information 142 is the piece of acquired attribute information 142 including the piece of acquisitor identification information 143 and the piece of attribute identification information 145 which are matched with the piece of acquisitor identification information 613 and the piece of attribute identification information 615, respectively, which are included in the piece of disclosed attribute information 612.

In addition, the attribute synthetic information determination unit 120 may make a determination on the basis of the pieces of acquired attribute information 142 corresponding to the respective pieces of disclosed attribute information 612 which have been received within a predetermined period of time (for example, the past 24 hours). In this case, the piece of acquired attribute information 142 may be configured so as to include a reception time clock (not illustrated) regarding the piece of disclosed attribute information 612 corresponding to.

The protection processing execution unit 160 carries out predetermined protection processing on the basis of a determination result having been received from the attribute synthetic information determination unit 120. The protection processing is processing for performing protection on a relevant attribute.

Here, this protection processing is, for example, to transmit a processed attribute or the provision disapproval notification as the piece of response information for a relevant disclosure request. Further, for example, the protection processing may be also to notify the provision apparatus 610 of a warning.

Next, operation of this exemplary embodiment will be described in detail with reference to FIGS. 1 to 9.

First, operation based on a first assumption shown below will be described.

For example, the determination condition is such that the number of the pieces of subject matched attribute information is larger than or equal to a predetermined threshold value. This threshold value is, for example, '5'.

The protection processing is assumed, for example, to transmit a processed attribute resulting from roughening the granularity level of a relevant attribute value or to transmit the provision disapproval notification, as the piece of response information.

The acquired attribute information table 141 is in the state shown in FIG. 3. In addition, the acquired attribute information table 141 in the state shown in FIG. 3 includes the four pieces of acquired attribute information 142 in each of which the piece of acquisitor identification information 143 is denoted by 'RID1' and the piece of subject identification information 144 is denoted by 'SID1'.

The received piece of disclosed attribute information 612 is the piece of disclosed attribute information 612 shown in FIG. 2. The above are included in the first assumption.

Figure 4:
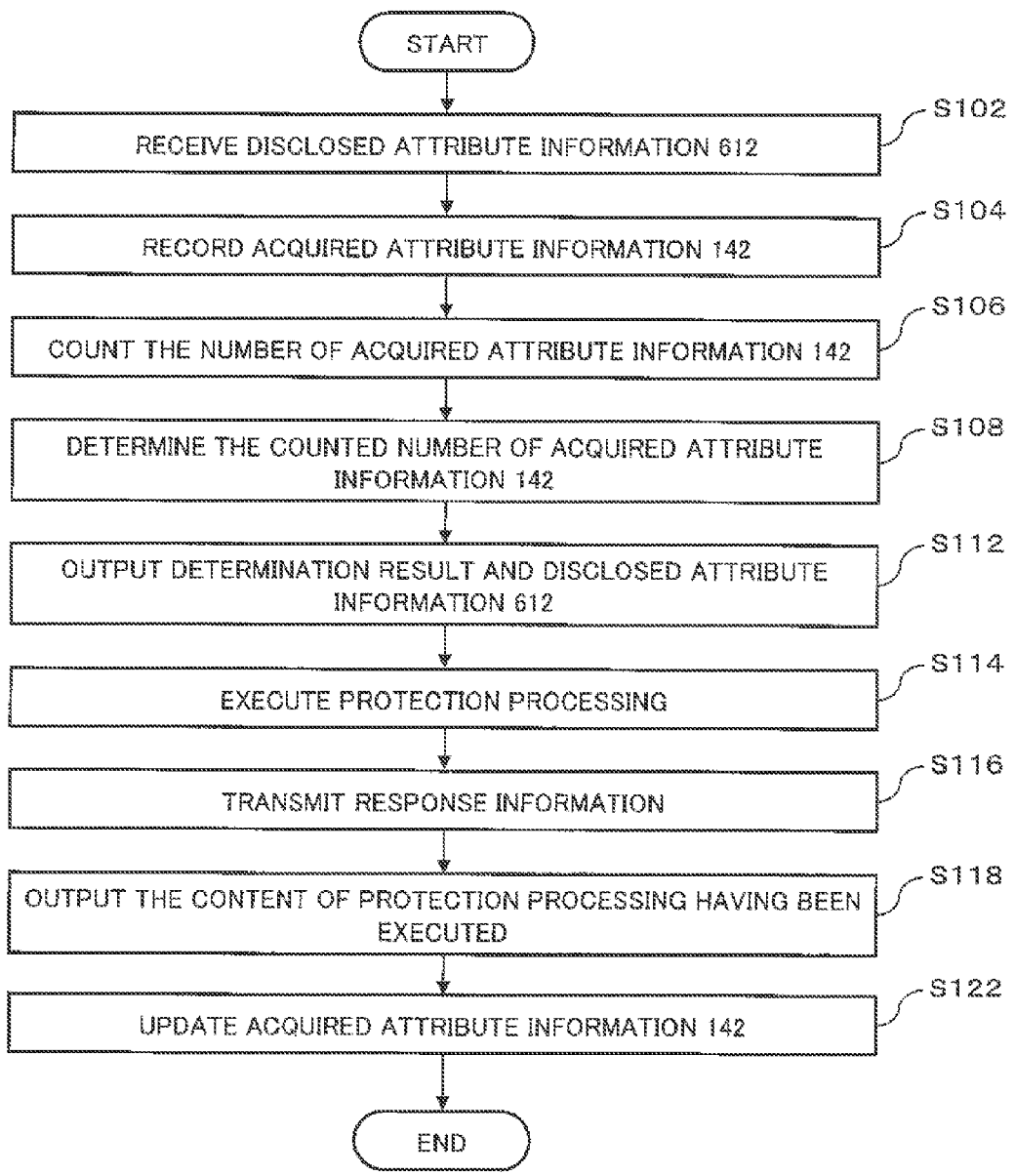
FIG. 4 is a flowchart illustrating operation based on first and second assumptions for an information monitoring apparatus in the first exemplary embodiment.

FIG. 4 is a flowchart illustrating operation of the information monitoring apparatus 110 of this exemplary embodiment.

First, the attribute synthetic information determination unit 120 receives the piece of disclosed attribute information 612 (S102).

Next, the attribute synthetic information determination unit 120 records the received piece of disclosed attribute information 612 into the acquired attribute information table 141 as the piece of acquired attribute information 142 (S104). In addition, through this processing, the received piece of disclosed attribute information 612 is stored in the acquired attribute information storage unit 140 as one of the pieces of acquired attribute information 142, so that the pieces of subject matched attribute information thereof are in the state where they include the received piece of disclosed attribute information 612.

Next, the attribute synthetic information determination unit 120 searches the acquired attribute information table 141 on the basis of the piece of acquisitor identification information 613 and the piece of subject identification information 614 which are included in the received piece of disclosed attribute information 612, and thereby counts the number of pieces of acquired attribute information 142 which are pieces of subject matched attribute information among the pieces of acquired attribute information 142 (S106). According to the assumption for this description, the counted number is '5'.

Next, the attribute synthetic information determination unit 120 determines whether or not the counted number is larger than or equal to the threshold value '5' (S108). According to the assumption for this description, the determination results in that 'the determination condition is satisfied'. In addition, in the case where the counted number is smaller than '5', the determination results in that 'the determination condition is not satisfied'.

Next, the attribute synthetic information determination unit 120 outputs the determination result and the piece of disclosed attribute information 612 to the protection processing execution unit 160 (S112).

Next, the protection processing execution unit 160 performs protection processing thereon (S114). Specifically, in the case where the received determination result is such that 'the determination condition is satisfied', the protection processing execution unit 160 creates any one of a processed attribute resulting from roughening the granularity level of an attribute value of the attribute 616 included in the received piece of disclosed attribute information 612, and the provision disapproval notification. In addition, in the case where the received determination result is such that 'the determination condition is not satisfied', the protection processing execution unit 160 does not perform any protection processing. According to the assumption for this description, the protection processing execution unit 160 creates a processed attribute resulting from processing an attribute value 'twenty-one years old' into an attribute value 'twenties'.

Next, the protection processing execution unit 160 transmits the piece of response information including the processed attribute (S116). Specifically, in the case where the received determination result is such that 'the determination condition is not satisfied', the protection processing execution unit 160 transmits the piece of response information including the attribute 616 which is not subjected to any protection processing. Further, in the case where the received determination result is such that 'the determination condition is satisfied' and the processed attribute has been created, the protection processing execution unit 160 transmits the piece of response information including this piece of processed information. Further, operation of the protection processing execution unit 160 in the case where the received determination result is such that 'the determination condition is satisfied' and any processed attribute has not been created will be described in description based on a second assumption condition described below.

Next, the protection processing execution unit 160 outputs the content of protection processing having been executed to the attribute synthetic information determination unit 120 (S118). The content of protection processing having been executed is such that 'a processed attribute has been transmitted as the piece of response information'.

Next, the attribute synthetic information determination unit 120 updates the piece of acquired attribute information 142 corresponding to the piece of disclosed attribute information 612 on the basis of the received content of protection processing having been executed (S122). The attribute synthetic information determination unit 120 updates an attribute value 'twenty-one years old' of an attribute 146 included in the piece of acquired attribute information 142 corresponding to the piece of disclosed attribute information 612 into an attribute value 'twenties'.

With the above operation, the description of the operation based on the first assumption ends.

Next, operation based on a second assumption shown below will be described. Here, portions different from the above-described operation based on the first assumption will be described.

The determination condition and the protection processing are the same as those under the first assumption.

The acquired attribute information table 141 is, for example, in the state shown in FIG. 6.

Figure 5:
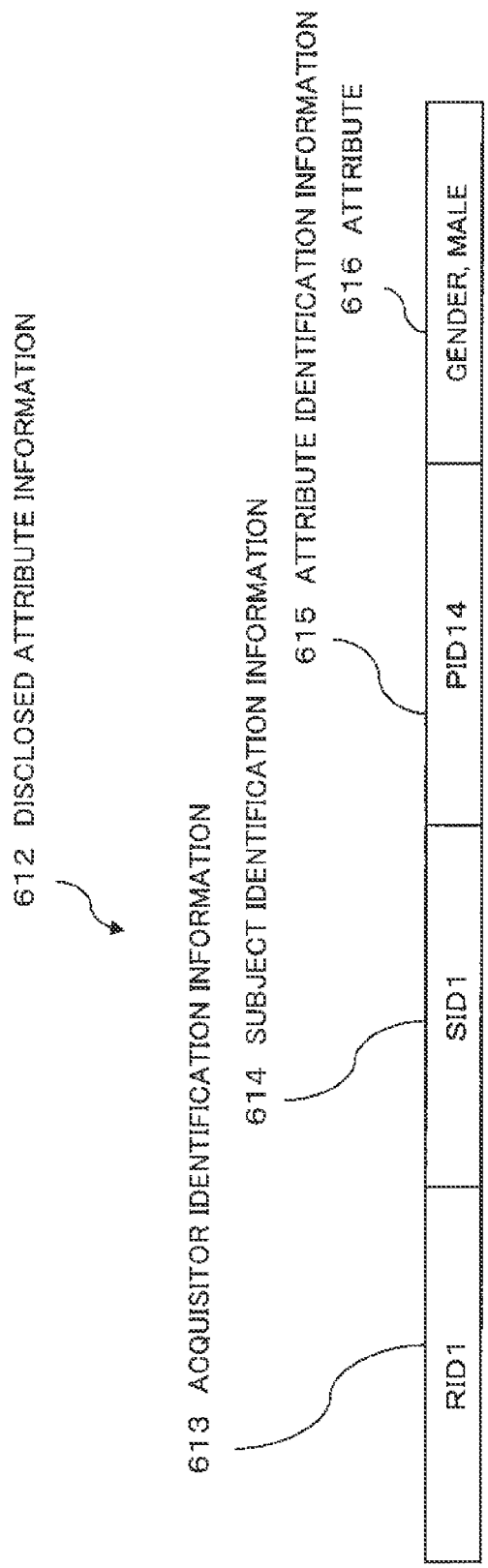
FIG. 5 is a diagram illustrating an example of disclosed attribute information in the first exemplary embodiment.

The received piece of disclosed attribute information 612 is, for example, the piece of disclosed attribute information 612 shown in FIG. 5.

With respect to an attribute value (for example, male) of an attribute name 'gender', the granularity level thereof cannot be roughened. The above are included in the second assumption.

Operation of the information monitoring apparatus 110 in the case of the second assumption is illustrated by the flowchart shown in FIG. 4 just like in the case of the first assumption.

In S114, according to the assumption for this description, the protection processing execution unit 160 cannot roughen the granularity level of the attribute value 'male', and thus, creates the provision disapproval notification.

In S116, according to the assumption for this description, the protection processing execution unit 160 transmits the provision disapproval notification as the piece of response information. This is operation of the protection processing execution unit 160 in the case where the received determination result is such that 'the determination condition is satisfied' and any processed attribute therefor has not been created.

In S118, the content of protection processing having been executed is such that 'the provision disapproval notification has been transmitted as the piece of response information'.

In S122, the protection processing execution unit 160 deletes one of the pieces of acquired attribute information 142 which corresponds to the piece of disclosed attribute information 612.

With the above operation, the description of the operation based on the second assumption ends.

Next, operation based on a third assumption shown below will be described. Here, portions different from the above-described operation based on the first assumption will be described.

The determination condition is, for example, such that the number of kinds of attribute name regarding both the attributes 146 included in respective pieces of subject matched attribute information, and the attribute 616 included in the piece of disclosed attribute information 612 is larger than or equal to a predetermined threshold value. The threshold value is, for example, '4'.

The protection processing is to notify the provision apparatus 610 of a warning.

The acquired attribute information table 141 is, for example, in the state shown in FIG. 6. In addition, the acquired attribute information table 141 in the state shown in FIG. 6 includes the four pieces of acquired attribute information 142 in each of which the piece of acquisitor identification information 143 is denoted by 'RID1' and the piece of subject identification information 144 is denoted by 'SID1'.

The received piece of disclosed attribute information 612 is the piece of disclosed attribute information 612 shown in FIG. 5. The above are included in the third assumption.

Figure 7:
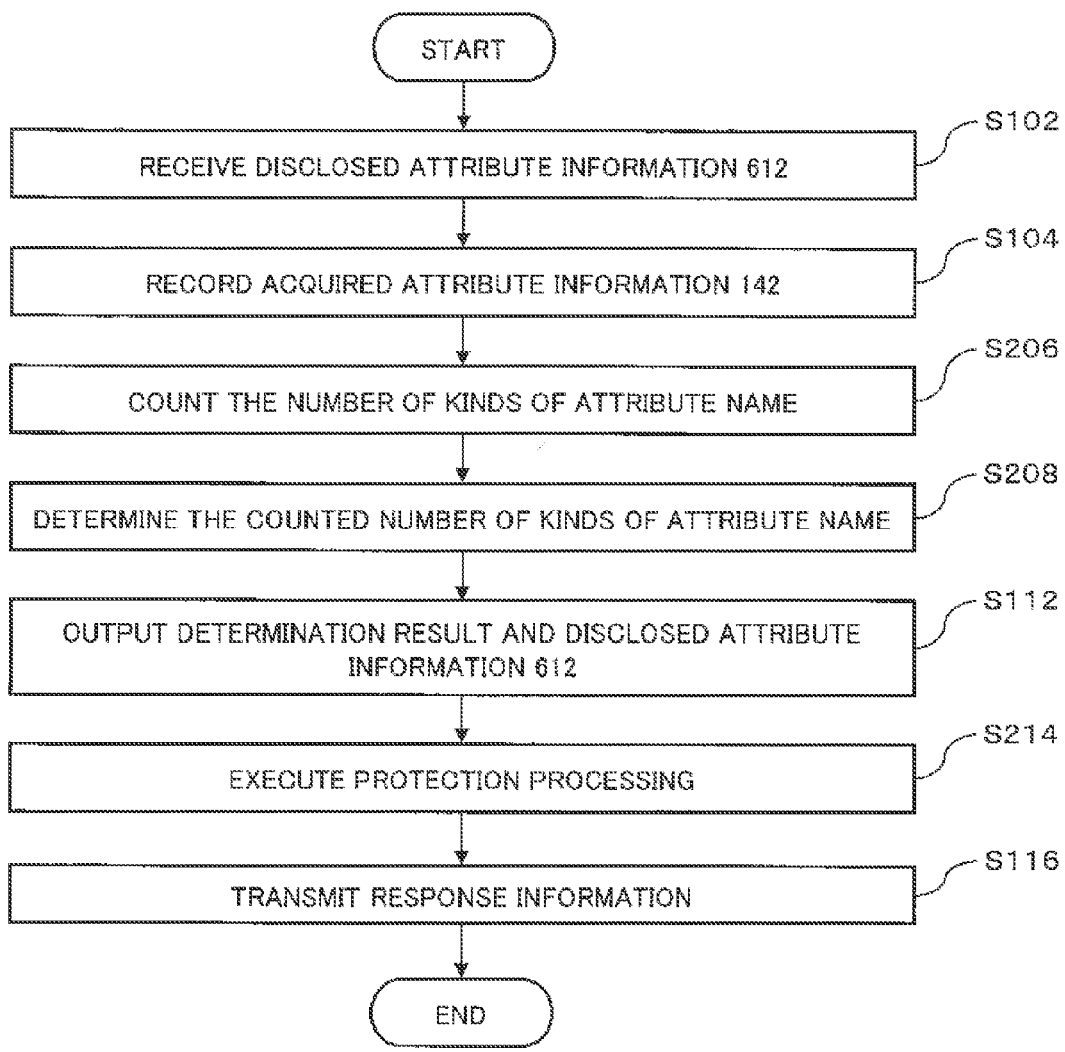
FIG. 7 is a flowchart illustrating operation based on a third assumption for an information monitoring apparatus in the first exemplary embodiment.

FIG. 7 is a flowchart illustrating operation of the information monitoring apparatus 110 of this exemplary embodiment under the above-described assumption.

First, in S102 to S104, the information monitoring apparatus 110 performs the same operation as that in the case of the first assumption.

Next, the attribute synthetic information determination unit 120 searches the acquired attribute information table 141 on the basis of the piece of acquisitor identification information 613 and the piece of subject identification information 614 which are included in the received piece of disclosed attribute information 612. Further, the attribute synthetic information determination unit 120 counts the number of kinds of attribute name regarding the attributes 146 included in respective pieces of acquired attribute information 142 which are pieces of subject matched attribute information (S206). According to the assumption for this description, the counted number is '4' (i.e., age, a current location, occupation and gender).

Next, the attribute synthetic information determination unit 120 determines whether or not the counted number is larger than or equal to the threshold value '4' (S208). According to the assumption for this description, the determination results in that 'the determination condition is satisfied'. In addition, in the case where the counted number is less than '4', the determination results in that 'the determination condition is not satisfied'.

Operation in S112 is the same as the operation in the case of the first assumption.

Next, the protection processing execution unit 160 performs protection processing thereon (S214). Specifically, in the case where the received determination result is such that 'the determination condition is satisfied', the protection processing execution unit 160 transmits a warning to the provision apparatus 610. In addition, in the case where the received determination result is such that 'the determination condition is not satisfied', the protection processing execution unit 160 does not perform any protection processing. According to the assumption for this description, the protection processing execution unit 160 transmits a warning to the provision apparatus 610. In addition, this warning may be transmitted by using an interface (not illustrated) between the information monitoring apparatus 110 and the provision apparatus 610, or may be transmitted via the relay unit 180.

Next, the protection processing execution unit 160 transmits the piece of response information including the attribute 616 (S216).

With the above operation, the description of the operation based on the third assumption ends.

Next, operation based on a fourth assumption shown below will be described. Here, portions different from the above-described operation based on the first assumption will be described.

The determination condition is, for example, such that the number of the pieces of acquired attribute information 142 each including the piece of acquisitor identification information 143 and the piece of attribute identification information 145 which are matched with the piece of acquisitor identification information 613 and the piece of attribute identification information 615, respectively, which are included in the piece of disclosed attribute information 612, is larger than or equal to a predetermined threshold value. This threshold value is, for example, '2'.

Figure 8:
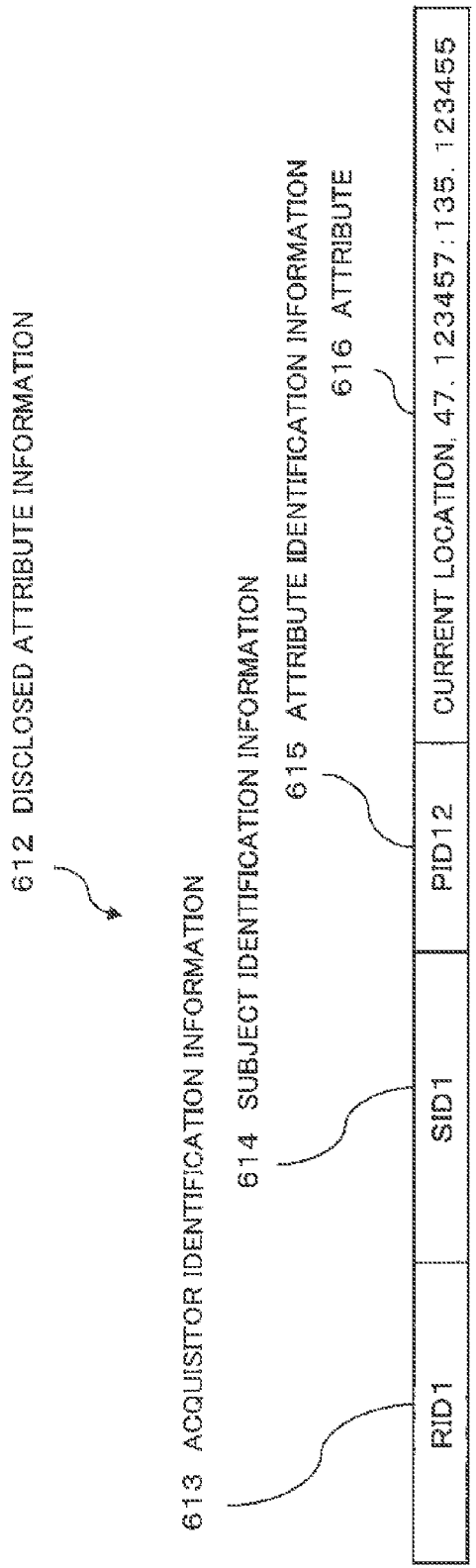
FIG. 8 is a diagram illustrating an example of disclosed attribute information in the first exemplary embodiment.

The received piece of disclosed attribute information 612 is, for example, the piece of disclosed attribute information 612 shown in FIG. 8.

The protection processing and the state of the acquired attribute information table 141 are the same as those in the case of the first assumption. The above are included in the fourth assumption. In addition, the acquired attribute information table 141 in the state shown in FIG. 3 includes the two pieces of acquired attribute information 142 in each of which the piece of acquisitor identification information 143 is denoted by 'RID1' and the piece of attribute identification information 615 is denoted by 'PID12'.

Figure 9:
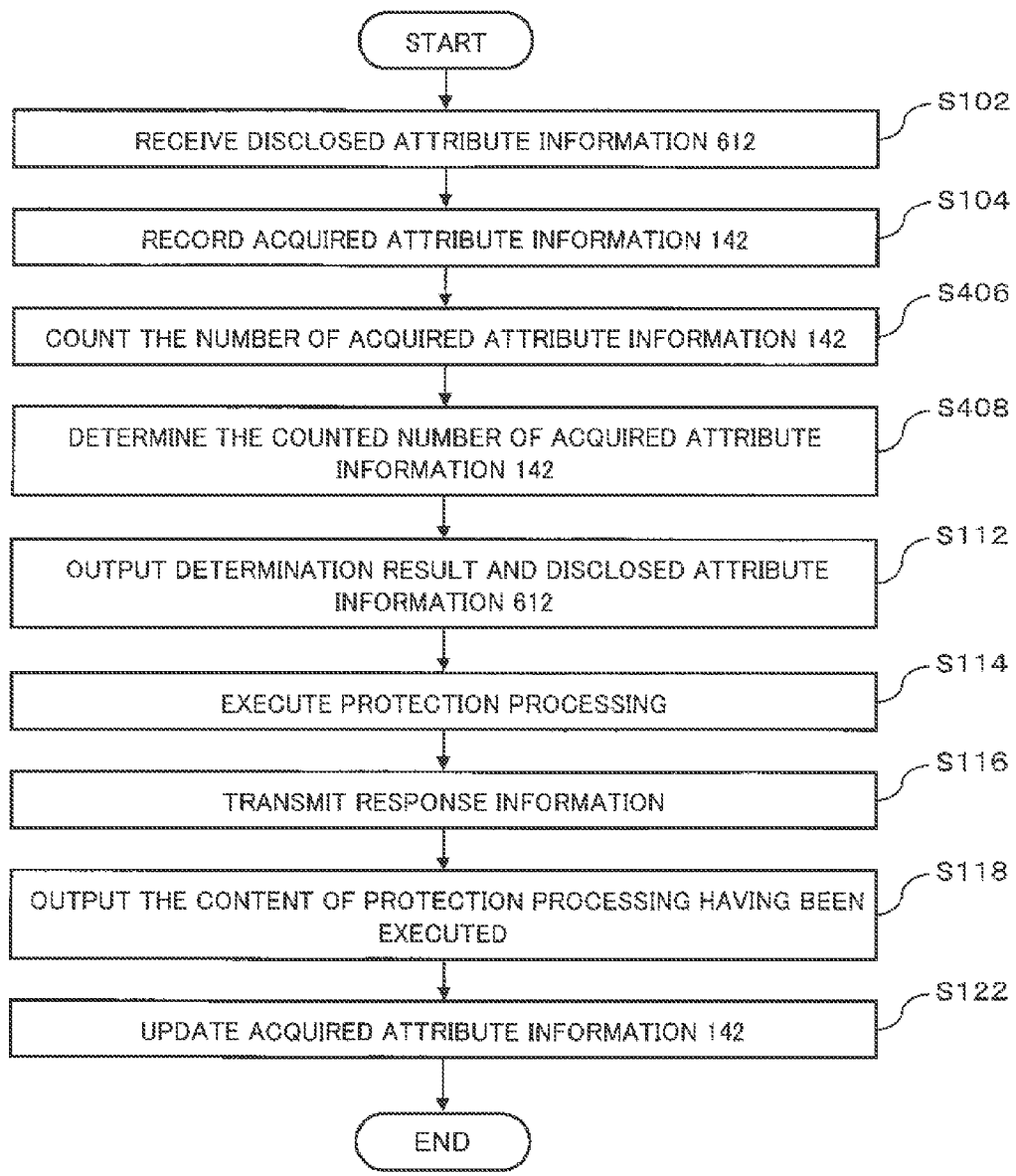
FIG. 9 is a flowchart illustrating operation based on a fourth assumption for an information monitoring apparatus in the first exemplary embodiment.

FIG. 9 is a flowchart illustrating operation of the information monitoring apparatus 110 of this exemplary embodiment under the above-described assumption.

First, in S102 to S104, the information monitoring apparatus 110 performs the same operation as that in the case of the first assumption.

Next, the attribute synthetic information determination unit 120 counts the number of the pieces of acquired attribute information 142 including the piece of acquisitor identification information 143 and the piece of attribute identification information 145 which are matched with the piece of acquisitor identification information 613 and the piece of attribute identification information 615, respectively, which are included in the received piece of disclosed attribute information 612 (S406). According to the assumption, the counted number is '2'.

Next, the attribute synthetic information determination unit 120 determines whether or not the counted number is larger than or equal to the threshold value '2' (S408). According to the assumption, the determination results in that 'the determination condition is satisfied'. In addition, in the case where the counted number is less than '2', the determination results in that 'the determination condition is not satisfied.'

Operation in S112 to S122 is the same as that in the case of the first assumption. In addition, in S114, according to the assumption for this description, the protection processing execution unit 160 creates a processed attribute by processing an attribute value '47.123457: 35.123455' into an attribute value '47.123: 135.123'. Further, in S122, according to the assumption for this description, the protection processing execution unit 160 updates the attribute value '47.123457: 135.123455' of the attribute 146 included in the piece of acquired attribute information 142 corresponding to the piece of disclosed attribute information 612 into '47.123: 135.123'.

With the above operation, the description of the operation based on the fourth assumption ends.

The above-described operations based on the respective first to fourth assumptions may be dynamically selected by a selection unit (not illustrated) on the basis of a predetermined condition.

Figure 10:
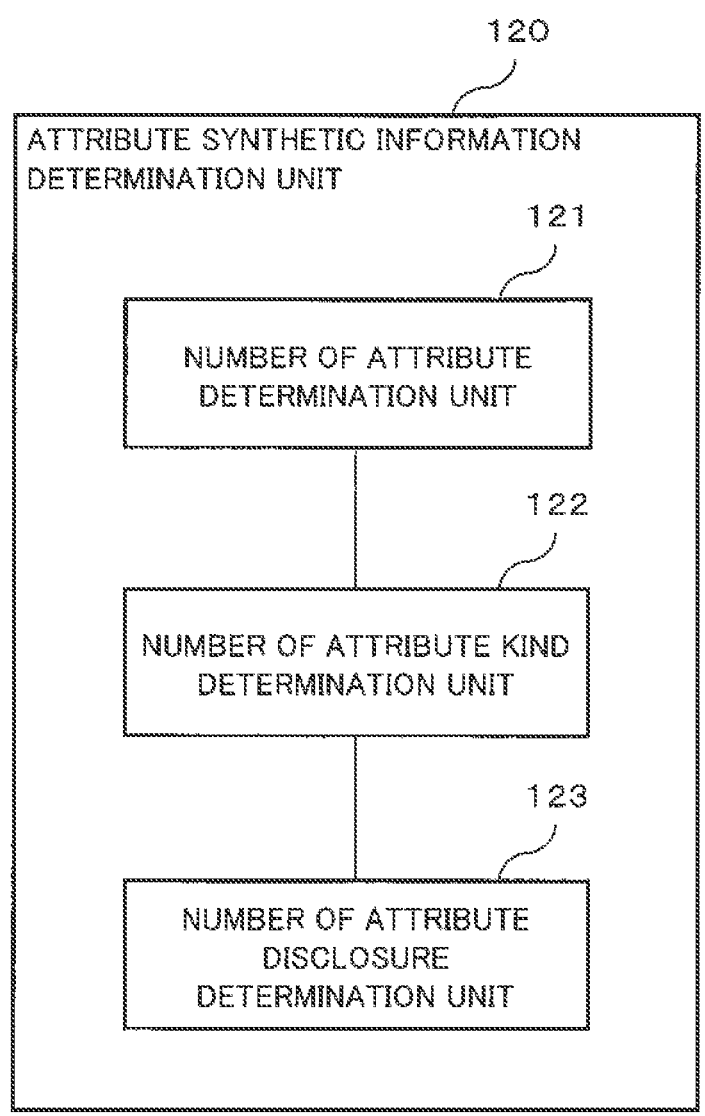
FIG. 10 is a block diagram illustrating a first internal configuration of synthetic information determination unit in the first exemplary embodiment.

Further, as shown in FIG. 10, the attribute synthetic information determination unit 120 may include a number of attribute determination unit 121, a number of attribute kind determination unit 122 and a number of attribute disclosure determination unit 123. FIG. 10 is a block diagram illustrating an internal configuration of the attribute synthetic information determination unit 120.

The number of attribute determination unit 121 makes a determination by handling an upper value of the number of attributes as a determination condition. That is, it performs the operation having been described under the first assumption and the second assumption.

The number of attribute kind determination unit 122 makes a determination by handling an upper limit value of the number of kinds of attribute as a determination condition. That is, it performs the operation having been described under the third assumption.

The number of attribute disclosure determination unit 123 makes a determination by handling an upper limit value of the number of disclosures of an attribute as a determination condition. That is, it performs the operation having been described under the fourth assumption.

In addition, the attribute synthetic information determination unit 120 may transfer only the determination result to the protection processing execution unit 160. In this case, the protection processing execution unit 160 may be configured so as to notify the relay unit 180 of the content of protection processing in order to direct the relay unit 180 to perform protection processing in accordance therewith. Further, the relay unit 180 may be configured so as to create the piece of response information on the basis of the direction having been received from the protection processing execution unit 160, and transmit the created piece of response information to the acquisition apparatus 630. In this case, the relay unit 180 may be configured so as to notify the attribute synthetic information determination unit 120 of the content of the piece of response information.

Further, the protection processing execution unit 160 may be included in the relay unit 180.

Further, the relay unit 180 may be included in the information monitoring apparatus 110.

An advantageous effect of this exemplary embodiment described above is that it is made possible to prevent personal information from being acquired by a disclosure requester for the purpose of an unfair use thereof.

A reason for this is that configuration has been made such that the attribute synthetic information determination unit 120 determines the piece of attribute synthetic information based on attributes an acquisitor has already acquired, as well as an attribute the acquisitor is attempting to acquire, and the protection processing execution unit 160 performs protection processing on the attribute on the basis of the result of the determination.

<Second Exemplary Embodiment>

Next, a second exemplary embodiment will be described in detail with reference to drawings. Hereinafter, description of contents duplicated with those having been described above will be omitted within a scope in which description of this exemplary embodiment does not become unclear.

Figure 11:
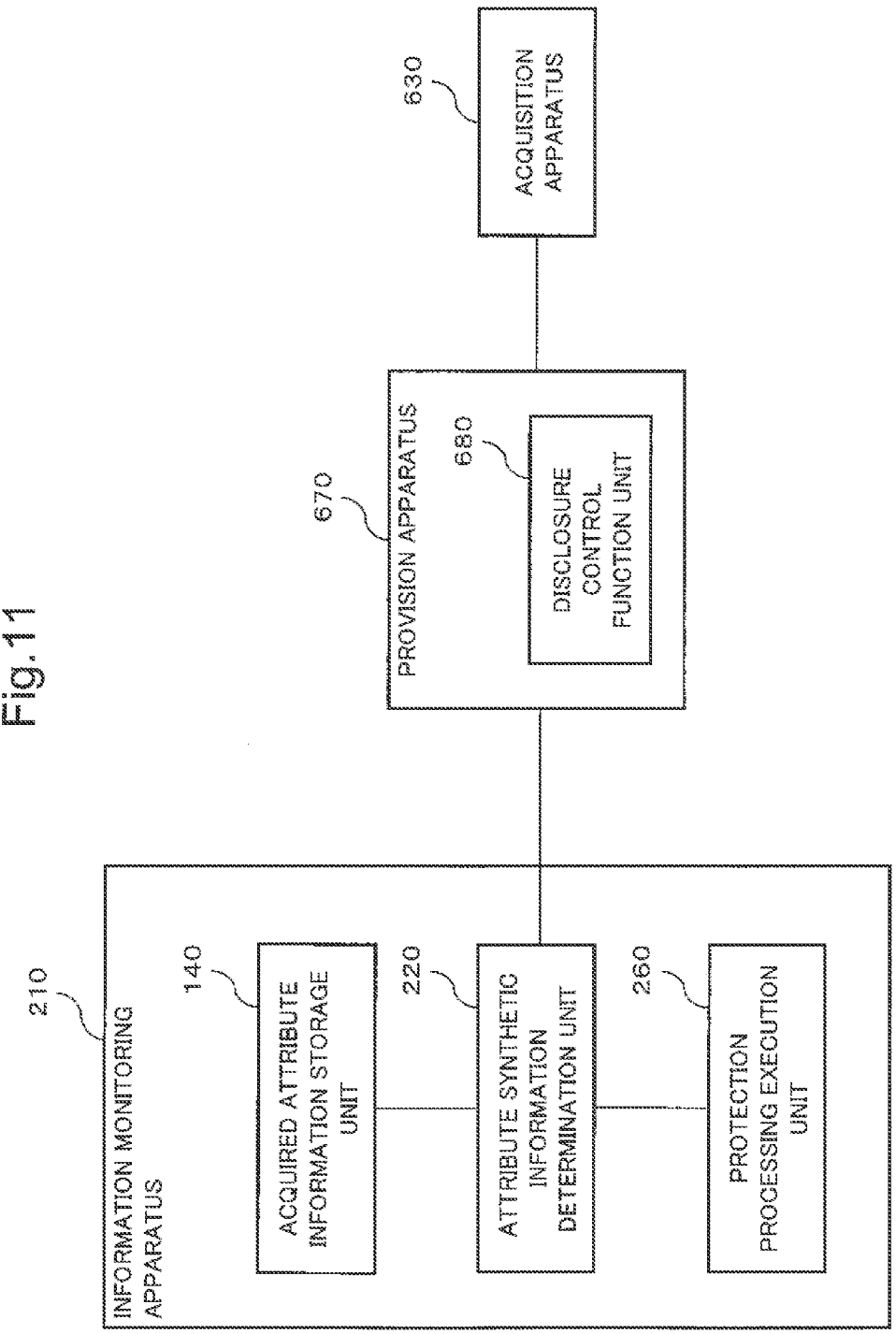
FIG. 11 is a block diagram illustrating a configuration of a second exemplary embodiment.

FIG. 11 is block diagram illustrating a configuration of this exemplary embodiment.

Referring to FIG. 11, this exemplary embodiment includes a provision apparatus 670, the acquisition apparatus 630 and an information monitoring apparatus 210. The provision apparatus 670 and the information monitoring apparatus 210 are connected to each other via a network which is not illustrated. The acquisition apparatus 630 and the provision apparatus 670 are connected to each other via a network which is not illustrated. In addition, with respect to each of the provision apparatus 670 and the acquisition apparatus 630, there may exist an arbitrary number of apparatuses.

The acquisition apparatus 630 transmits an attribute request to the provision apparatus 670, and receives the piece of response information which is transmitted from the provision apparatus 670 as a response to the attribute request.

The provision apparatus 670 receives the attribute request, and in response thereto, transmits the piece of disclosed attribute information 612 to the information monitoring apparatus 210. Further, the provision apparatus 670 transmits a piece of attribute information to the information monitoring apparatus 210 and receives a protection direction which is transmitted from the information monitoring apparatus 210 as a response to the piece of disclosed attribute information 612.

The provision apparatus 670 includes a disclosure control function unit 680. The disclosure control function unit 680 determines the content of the piece of response information on the basis of the received protection direction, that is, the disclosure control function unit 680 performs control of disclosure of an attribute. In addition, the disclosure control function unit 680 may be configured to, in order to perform control of the disclosure of an attribute, to determine the content of the piece of response information on the basis of the received protection direction and protection rules the provision apparatus 670 separately retains.

The information monitoring apparatus 210 includes the acquired attribute information storage unit 140, an attribute synthetic information determination unit 220 and a protection processing execution unit 260.

The acquired attribute information storage unit 140 is the same component as that having been described in the first exemplary embodiment.

The attribute synthetic information determination unit 220 is equal to the attribute synthetic information determination unit 120 having been described in the first exemplary embodiment. In this exemplary embodiment, nevertheless, the attribute synthetic information determination unit 220 receives the piece of disclosed attribute information 612 from the provision apparatus 670, and outputs the determination result to the protection processing execution unit 260.

The protection processing execution unit 260 is equal to the protection processing execution unit 160 having been described in the first exemplary embodiment. In this exemplary embodiment, nevertheless, the protection processing execution unit 260 performs predetermined protection processing on the basis of the determination result having been received from the attribute synthetic information determination unit 220.

Further, in this exemplary embodiment, the protection processing is, for example, to determine the content of protection and transmit a protection direction including the determined content of protection to the provision apparatus 670. In addition, the content of the protection is to transmit any one of the processed attribute and the provision disapproval notification which have been described in the first exemplary embodiment. Further, for example, the content of protection may be to perform control of disclosure of an attribute on the basis of protection rules the provision apparatus 670 separately retains.

In addition, operation of the information monitoring apparatus 210 of this exemplary embodiment is substantially equal to the operation of the information monitoring apparatus 110 of the first exemplary embodiment, and thus, is omitted from description.

Next, a first modification example of this exemplary embodiment will be described. This modification example is a modification example which has an advantageous effect of preventing attributes from being accumulated in the information monitoring apparatus 210.

A configuration of the information monitoring apparatus 210 in this modification example is the configuration shown in the block diagram of FIG. 11.

Figure 12:
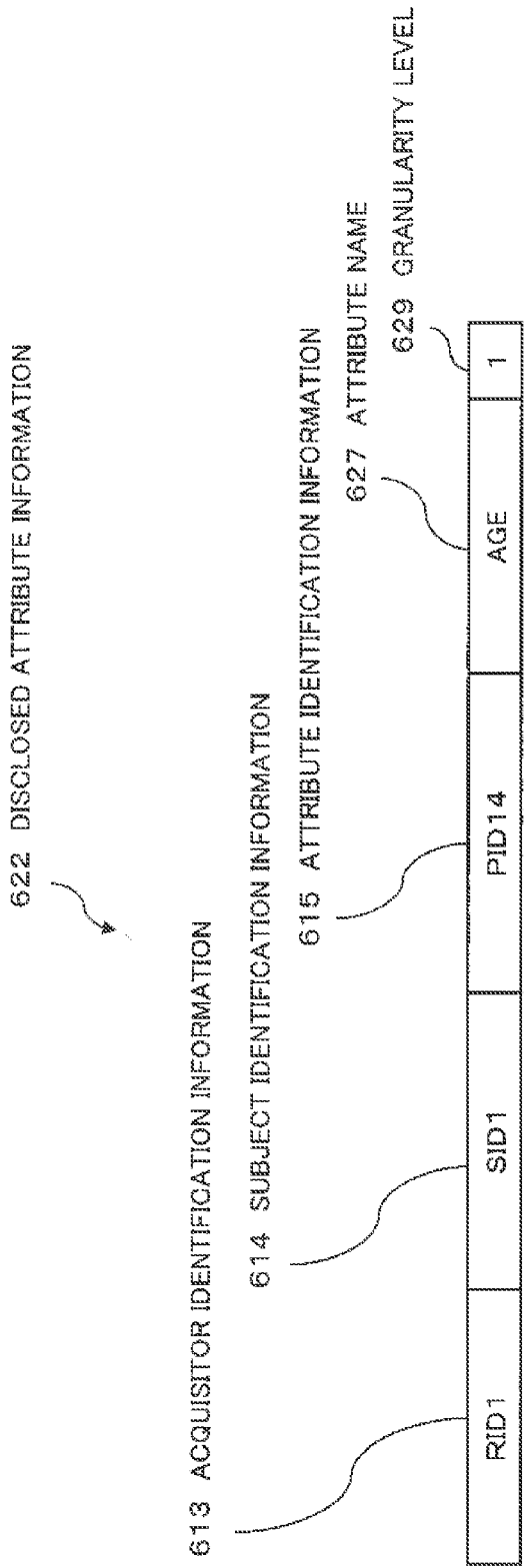
FIG. 12 is a diagram illustrating an example of disclosed attribute information in the second exemplary embodiment.

FIG. 12 is a diagram illustrating an example of a piece of disclosed attribute information 622 in this modification example. As shown in FIG. 12, as compared with the piece of disclosed attribute information 612 shown in FIG. 2, the piece of disclosed attribute information 622 is different in the respect that it does not include the attribute 616 but includes an attribute name 627 and a granularity level 629.

The attribute name 627 is an attribute name of the attribute 616.

The granularity level 629 is a granularity level of an attribute value of the attribute 616. In this exemplary embodiment, the granularity level 629 is represented by a ratio of the effective digit number of a processed attribute value having been processed so as to roughen the granularity level of an original attribute value, relative to the effective digit number of the original attribute value. For example, in the case of an attribute value of an attribute name 'age', with respect to an original attribute value 'twenty-five years old' (the effective digit number thereof is two digits) and an attribute value 'twenty' (the effective digit number thereof is one digit) which has been processed so as to roughen the granularity level of the original attribute value, the granularity level 629 is '0.5'. In addition, the granularity level 629 of an attribute value which is not processed is made '1'.

FIG. 13 is a diagram illustrating an example of an acquired attribute information table 241 stored by the acquired attribute information storage unit 140 in this modification example. As shown in FIG. 13, as compared with the piece of acquired attribute information 142 shown in FIG. 3, a piece of acquired attribute information 242 included in the acquired attribute information table 241 is different in the respect that it does not include the attribute 146 but includes an attribute name 247 and a granularity level 249.

The attribute name 247 is the attribute name 627 retained by the acquired attribute information storage unit 140.

The granularity level 249 is the granularity level 629 retained by the acquired attribute information storage unit 140.

In this modification example, the attribute synthetic information determination unit 220 determines whether or not, in the case where the acquisition apparatus 630 will have received an attribute corresponding to the piece of disclosed attribute information 622, the piece of attribute synthetic information regarding the attribute with respect to the acquisition apparatus 630 satisfies each of predetermined one or more determination conditions. Here, the attribute synthetic information determination unit 220 performs the above determination on the basis of the pieces of acquired attribute information 242 and the piece of disclosed attribute information 622 having been received from the provision apparatus 670. Subsequently, the attribute synthetic information determination unit 220 outputs the determination result to the protection processing execution unit 260.

Next, operation of this modification example will be described in detail with reference to FIGS. 11 to 14.

Here, operation based on an assumption shown below will be described.

The determination condition is, for example, such that a sum total of the granularity levels 249 included in the pieces of subject matched attribute information is larger than or equal to a predetermined threshold value. This threshold value is, for example, '4.1'.

The protection processing is, as the piece of response information, for example, any one of transmitting of a processed attribute resulting from roughening the granularity level of a relevant attribute value and transmitting of the provision disapproval notification.

The acquired attribute information table 241 is in the state shown in FIG. 13. In addition, the acquired attribute information table 141 in the state shown in FIG. 13 includes the four pieces of acquired attribute information 242 in each of which the piece of acquisitor identification information 143 is denoted by 'RID1' and the piece of subject identification information 144 is denoted by 'SID1'.

The received piece of disclosed attribute information 622 is the piece of disclosed attribute information 622 shown in FIG. 12. The above are included in the assumption.

Figure 14:
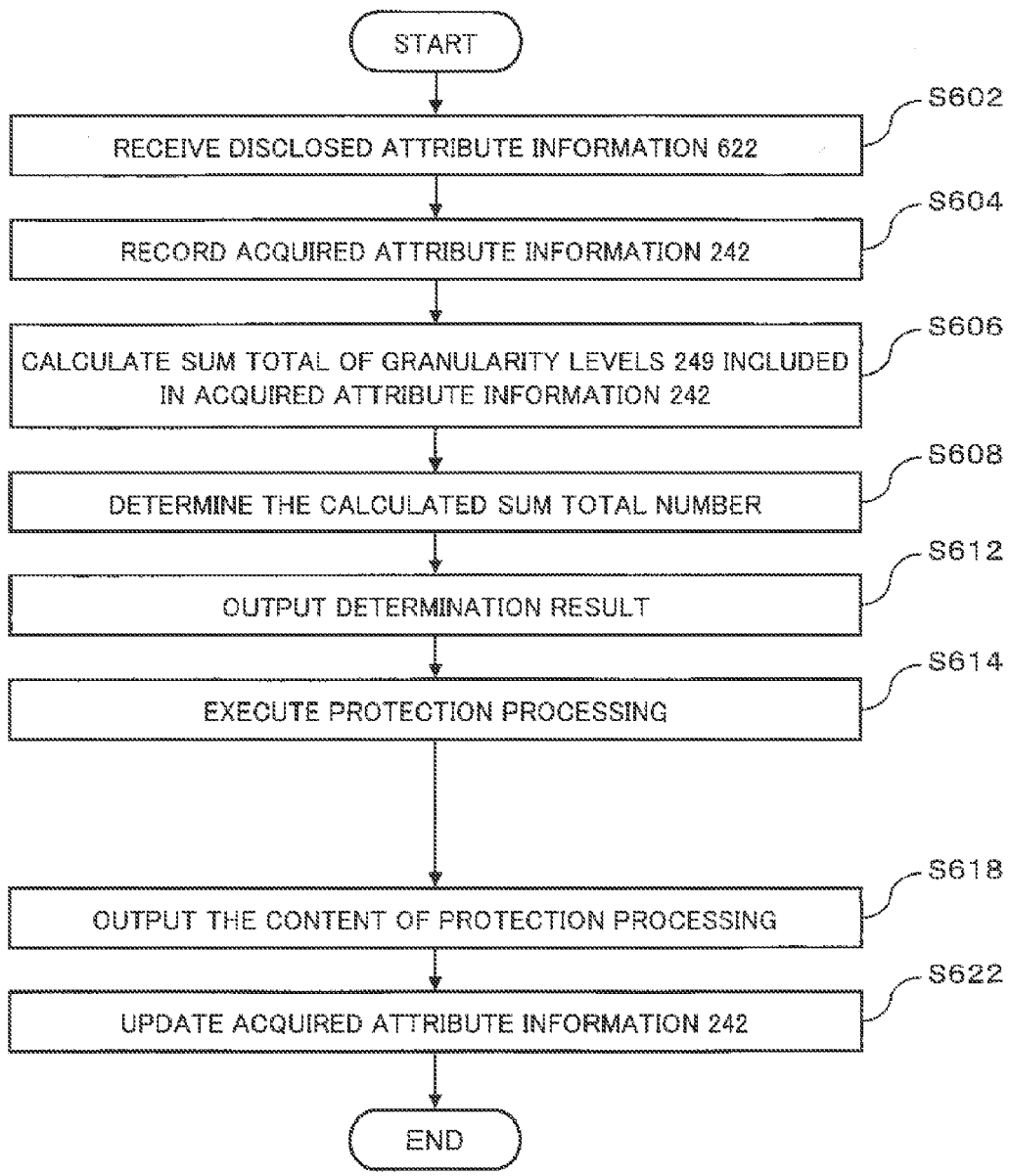
FIG. 14 is a flowchart illustrating operation of an information monitoring apparatus in the second exemplary embodiment.

FIG. 14 is a flowchart illustrating operation of the information monitoring apparatus 210 in this modification example.

First, the attribute synthetic information determination unit 220 receives the piece of disclosed attribute information 622 (S602).

Next, the attribute synthetic information determination unit 220 records the received piece of disclosed attribute information 622 into the acquired attribute information table 241 as the piece of acquired attribute information 242 (S604). In addition, through this processing, the received piece of disclosed attribute information 622 is stored in the acquired attribute information storage unit 140 as one of the pieces of acquired attribute information 242, so that the pieces of subject matched attribute information thereof are in the state where they include the received piece of disclosed attribute information 622.

Next, the attribute synthetic information determination unit 220 searches the acquired attribute information table 241 on the basis of the piece of acquisitor identification information 613 and the piece of subject identification information 614 which are included in the received piece of disclosed attribute information 622, and thereby calculates a sum total of the granularity levels 249 included in respective pieces of acquired attribute information 242 which are pieces of subject matched attribute information (S606). According to the assumption for this description, the calculated sum total number is '4.5'.

Next, the attribute synthetic information determination unit 220 determines whether or not the calculated sum total number is larger than or equal to the threshold value '4.1' (S608). According to the assumption for this description, the determination results in that 'the determination condition is satisfied'. In addition, in the case where the calculated sum total number is less than '4.1', the determination results in that 'the determination condition is not satisfied'.

Next, the attribute synthetic information determination unit 220 outputs the determination result to the protection processing execution unit 260 (S612).

Next, the protection processing execution unit 260 performs protection processing thereon (S614). Specifically, in the case where the received determination result is such that 'the determination condition is satisfied', the protection processing execution unit 260 determines the content of the protection and transmits a protection direction including the content of the determined protection to the provision apparatus 670. In addition, in the case where the received determination result is such that 'the determination condition is not satisfied', the protection processing execution unit 260 makes the content of the protection 'any protection is unnecessary to be performed'. According to the assumption for this description, the content of the protection is such that the granularity level of an attribute value included in an attribute corresponding to the received piece of disclosed attribute information 622 is made smaller than or equal to '0.5'.

Further, in the provision apparatus 670 which has received the protection direction, the disclosure control function unit 680 determines the content of the piece of response information on the basis of the protection direction. The disclosure control function unit 680 decides to handle a processed attribute resulting from stepping down the effective digit number of an attribute value of an attribute name 'age' by 1 digit as the piece of response information. Next, the provision apparatus 670 creates the piece of response information the disclosure control function unit 680 has decided, and transmits the created piece of response information to the acquisition apparatus 630.

Next, the protection processing execution unit 260 outputs the content of the protection included in the protection direction to the attribute synthetic information determination unit 220 (S618). The content of the protection included in the protection direction is such that 'the granularity level of the attribute value is to be made smaller than or equal to '0.5' as the piece of response information'.

Next, the attribute synthetic information determination unit 120 updates the piece of acquired attribute information 242 corresponding to the piece of disclosed attribute information 622 on the basis of the received content of protection processing having been executed (S622). The attribute synthetic information determination unit 120 updates the granularity level 249 '1' included in the piece of acquired attribute information 242 corresponding to the piece of disclosed attribute information 622 into '0.5'.

With the above operation, the description of the operation based on the first modification example ends.

Configuration may be made such that the above-described operation of the first modification of this exemplary embodiment and operation which is substantially equal to that of the first exemplary embodiment is dynamically selected by a selection unit (not illustrated) in accordance with a predetermined condition.

In addition, the protection processing execution unit 260 of the information monitoring apparatus 210 may be installed in the provision apparatus 670. Further, in this case, the protection processing execution unit 260 and the disclosure control function unit 680 may be integrated into one module.

Further, the above-described first modification example of this exemplary embodiment may be applied to the first exemplary embodiment. In this case, the disclosure control function unit 680 may be installed in the relay unit 180. Further, in this case, configuration may be made such that the operation based on the first to fourth assumptions having been described in the first exemplary embodiment and the operation of the first modification example having been described in this exemplary embodiment are dynamically selected by a selection unit (not illustrated) in accordance with a predetermined condition.

Further, the piece of disclosed attribute information may be configured so as to include encrypted attribute values.

A first advantageous effect of this exemplary embodiment described above is that, in addition to the advantageous effect of the first exemplary embodiment, even in the case where the provision apparatus 670 is connected to a system not via the relay unit 180, it is made possible to prevent personal information from being acquired for the purpose of an unfair use thereof.

A reason for this is that configuration has been made such that the attribute synthetic information determination unit 220 receives the piece of disclosed attribute information 612 and the piece of disclosed attribute information 622 from the provision apparatus 670, and the protection processing execution unit 260 transmits a protection direction to the provision apparatus 670.

A second advantageous effect of this exemplary embodiment described above is that it is made possible to prevent attributes from being accumulated in the information monitoring apparatus 210.

A reason for this is that the attribute synthetic information determination unit 220 has been configured so as to determine the piece of attribute synthetic information on the basis of the granularity levels 249 included in the pieces of acquired attribute information 242 and the granularity level 629 included in the piece of disclosed attribute information 622.

In addition, in the first exemplary embodiment, it is also possible to obtain the same advantageous effect as the second advantageous effect of the modification example of this exemplary embodiment by applying the modification example of this exemplary embodiment to the first exemplary embodiment.

<Third Exemplary Embodiment>

Next, a third exemplary embodiment will be described in detail with reference to drawings. Hereinafter, description of contents duplicated with those having been described above will be omitted within a scope in which description of this exemplary embodiment does not become unclear.

Figure 15:
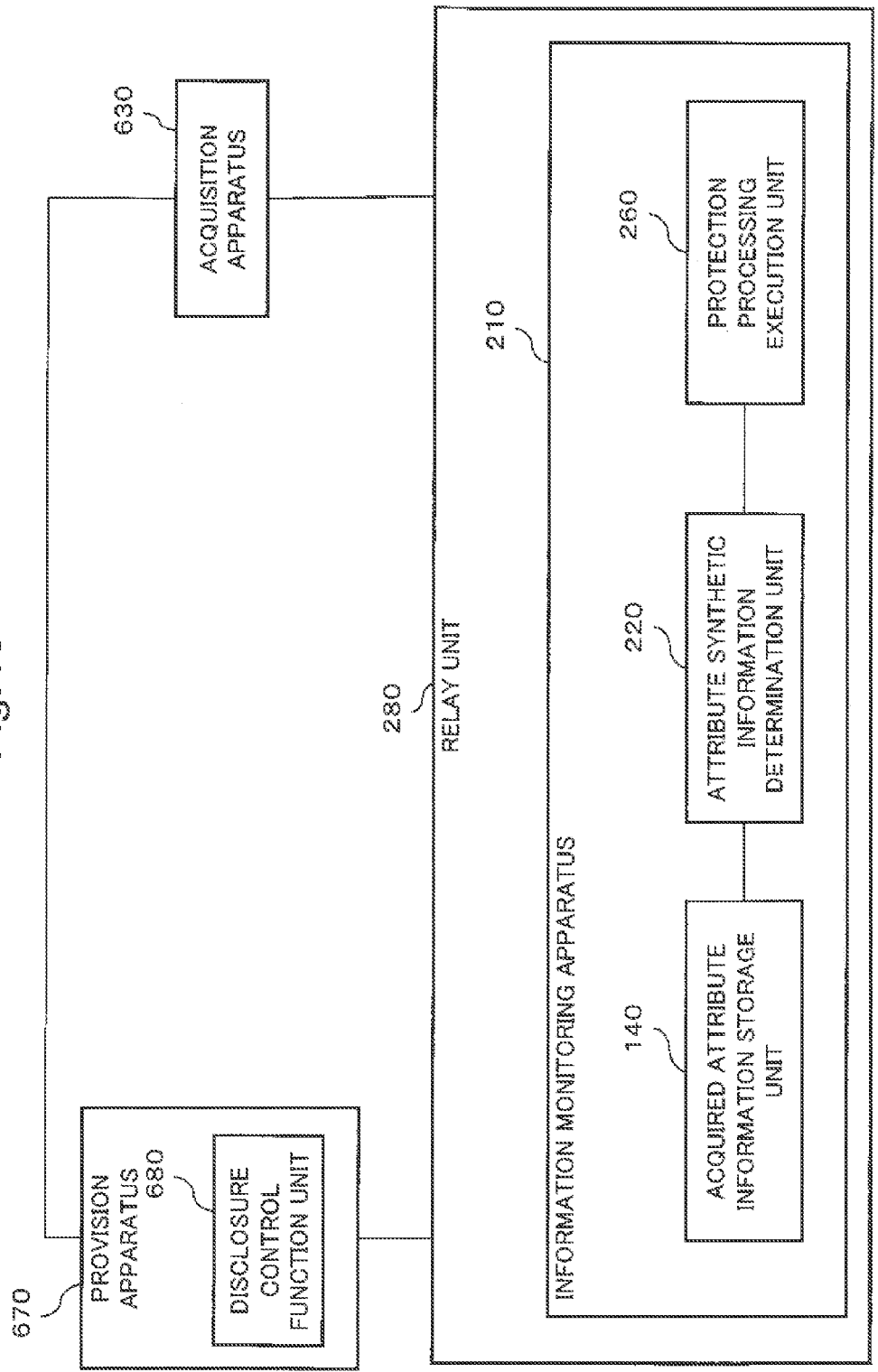
FIG. 15 is a block diagram illustrating a configuration of a third exemplary embodiment.

FIG. 15 is block diagram illustrating a configuration of this exemplary embodiment.

Referring to FIG. 15, this exemplary embodiment includes the provision apparatus 670, the acquisition apparatus 630 and a relay unit 280 including the information monitoring apparatus 210. The provision apparatus 670 and the relay unit 280 are connected to each other via a network which is not illustrated. The acquisition apparatus 630 and the relay unit 280 are connected to each other via a network which is not illustrated. The acquisition apparatus 630 and the provision apparatus 670 are connected to each other via a network which is not illustrated. In addition, with respect to each of the provision apparatus 670 and the acquisition apparatus 630, there may exist an arbitrary number of apparatuses.

The relay unit 280 receives a attribute request which has been transmitted by the acquisition apparatus 630.

The attribute synthetic information determination unit 220 of the information monitoring apparatus 210 included in the relay unit 280 determines whether or not, in the case where the acquisition apparatus 630 will have received an attribute corresponding to the attribute request, the piece of attribute synthetic information regarding the attribute with respect to the acquisition apparatus 630 satisfies each of one or more predetermined determination conditions. Here, the attribute synthetic information determination unit 220 performs the above determination on the basis of the pieces of acquired attribute information 142 and the received attribute request (including, for example, a relevant piece of acquisitor identification information, as well as a relevant piece of subject identification information and a relevant attribute name which correspond to a requested target attribute). Subsequently, the attribute synthetic information determination unit 220 outputs the determination result to the protection processing execution unit 260.

The protection processing execution unit 260 of the information monitoring apparatus 210 performs the same operation as that of the protection processing execution unit 260 having been described in the second exemplary embodiment.

Further, the relay unit 280 transmits the received attribute request to the provision apparatus 670.

The provision apparatus 670 includes the disclosure control function unit 680. The disclosure control function unit 680 determines the content of the piece of response information on the basis of a protection direction having been received from the protection processing execution unit 260 of the information monitoring apparatus 210, that is, the disclosure control function unit 680 performs control of the disclosure of a relevant attribute.

Next, the provision apparatus 670 transmits the piece of response information to the acquisition apparatus 630 on the basis of the received attribute request and the determination having been made by the protection processing execution unit 260.

An advantageous effect of this exemplary embodiment described above is that the number of the apparatuses is reduced and the same advantageous effect as that of the first exemplary embodiment can be obtained.

A reason for this is that configuration has been made such that the information monitoring apparatus 210 is included in the relay unit 280.

<Fourth Exemplary Embodiment>

Next, a fourth exemplary embodiment will be described in detail with reference to drawings. Hereinafter, description of contents duplicated with those having been described above will be omitted within a scope in which description of this exemplary embodiment does not become unclear.

Figure 16:
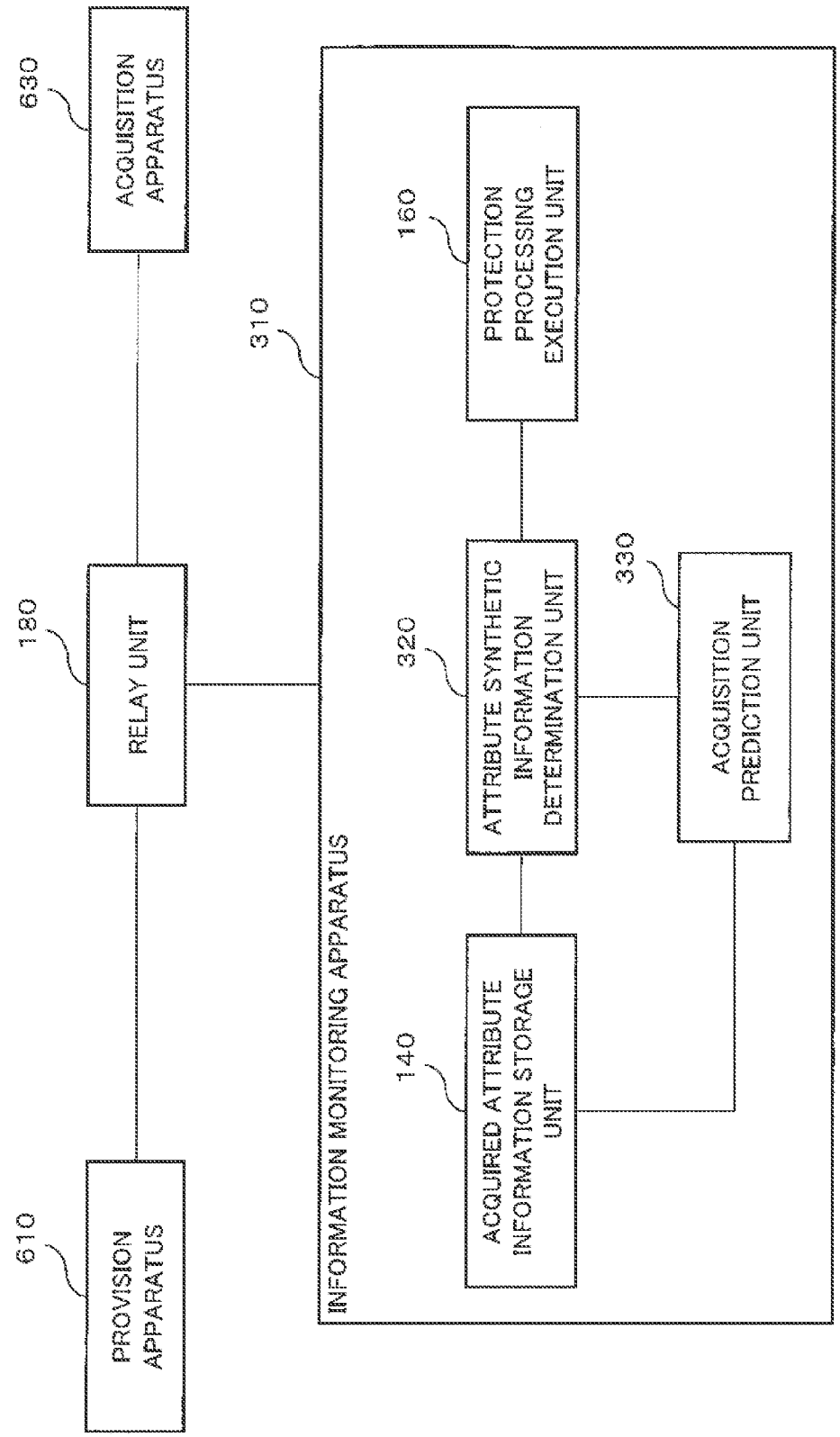
FIG. 16 is a block diagram illustrating a configuration of a fourth exemplary embodiment.

FIG. 16 is a block diagram illustrating a configuration of this exemplary embodiment.

Referring to FIG. 16, this exemplary embodiment includes the provision apparatus 610, the acquisition apparatus 630, the relay unit 180 and an information monitoring apparatus 310. The information monitoring apparatus 310 and the relay unit 180 are connected to each other via a network which is not illustrated.

The provision apparatus 610, the acquisition apparatus 630 and the relay unit 180 are the same components as those of the first exemplary embodiment.

The information monitoring apparatus 310 of this exemplary embodiment further includes an acquisition prediction unit 330, as compared with the information monitoring apparatus 110 of the first exemplary embodiment. Further, as compared with the information monitoring apparatus 110, the information monitoring apparatus 310 includes an attribute synthetic information determination unit 320 as a substitute for the attribute synthetic information determination unit 120.

The acquisition prediction unit 330 predicts an attribute name of an attribute which is likely to be disclosed to an acquisitor in future (the attribute being also referred to as a predicted attribute) on the basis of the pieces of acquired attribute information 142 and the piece of disclosed attribute information 622, and outputs a piece of predicted attribute information including the predicted attribute name.

Figure 17:
FIG. 17 is a diagram illustrating an example of predicted attribute information in the fourth exemplary embodiment.

FIG. 17 is a diagram illustrating an example of a piece of predicted attribute information 335. Referring to FIG. 17, the piece of predicted attribute information 335 includes an attribute name having been predicted by the acquisition prediction unit 330 described below (the attribute name being also referred to as a piece of identification information which indicates a kind).

The acquisition prediction unit 330 refers to a piece of tendency information indicating what kind of attribute the acquisition apparatus 630, which has already acquired some attributes, tends to acquire, and thereby performs the above-described prediction. In addition, the acquisition prediction unit 330 may have this tendency information in advance as knowledge information. Further, the acquisition prediction unit 330 may be configured so as to include a data mining unit (not illustrated), learn on the basis of the pieces of acquired attribute information 142 by using an existing method, such as a collaborative filtering method, and create this tendency information.

FIG. 18 is a diagram illustrating examples of a piece of tendency information 332. As shown in FIG. 18, the piece of tendency information 332 includes a piece of already acquired information 333 and a piece of prediction information 334. The piece of already acquired information 333 includes one or more attribute names of respective attributes which have already been acquired by the acquisition apparatus 630. The piece of prediction information 334 includes one or more attribute names of an attribute the acquisition apparatus 630, which has already acquired an attribute corresponding to the attribute names included in the piece of already acquired information 333, tends to further acquire. For example, a first row of the first tendency information 332 shows that the acquisition apparatus 630, which has already acquired an attribute corresponding to attribute names 'gender', 'a current location' and 'occupation', tends to further acquire an attribute corresponding to an attribute name 'age'. Moreover, for example, a second row of the second tendency information 332 shows that the acquisition apparatus 630, which has already acquired an attribute corresponding to an attribute name 'a current location' twice, tends to further acquire an attribute corresponding to the attribute name 'a current location'.

The attribute synthetic information determination unit 320 determines whether or not, in the case where the acquisition apparatus 630 will have acquired a specific attribute (a predicted attribute), the piece of attribute synthetic information regarding the attribute with respect to the acquisition apparatus 630 satisfies each of one or more determination conditions. Here, the attribute synthetic information determination unit 320 performs the above determination on the basis of the piece of the predicted attribute information 335, the pieces of acquired attribute information 142 and the piece of the disclosed attribute information 612. Further, the specific attribute (the predicted attribute) is an attribute (a predicted attribute) corresponding to the attribute 616 included in the piece of disclosed attribute information 612 and an attribute name included in the piece of predicted attribute information 335. Subsequently, the attribute synthetic information determination unit 320 outputs the determination result to the protection processing execution unit 160.

Next, operation of this exemplary embodiment will be described in detail with reference to FIGS. 16 to 21.

First, operation based on an assumption shown below will be described.

An acquired attribute information table 341 is in the state shown in FIG. 20. As shown in FIG. 20, as compared with the piece of acquired attribute information 142 shown in FIG. 3, a piece of acquired attribute information 342 included in the acquired attribute information table 341 is different in the respect that it further includes a granularity level 349. In addition, the acquired attribute information table 341 in the state shown in FIG. 20 includes four pieces of acquired attribute information 342 in each of which the piece of acquisitor identification information 143 is denoted by 'RID1' and the piece of subject identification information 144 is denoted by 'SID1'.

Figure 19:
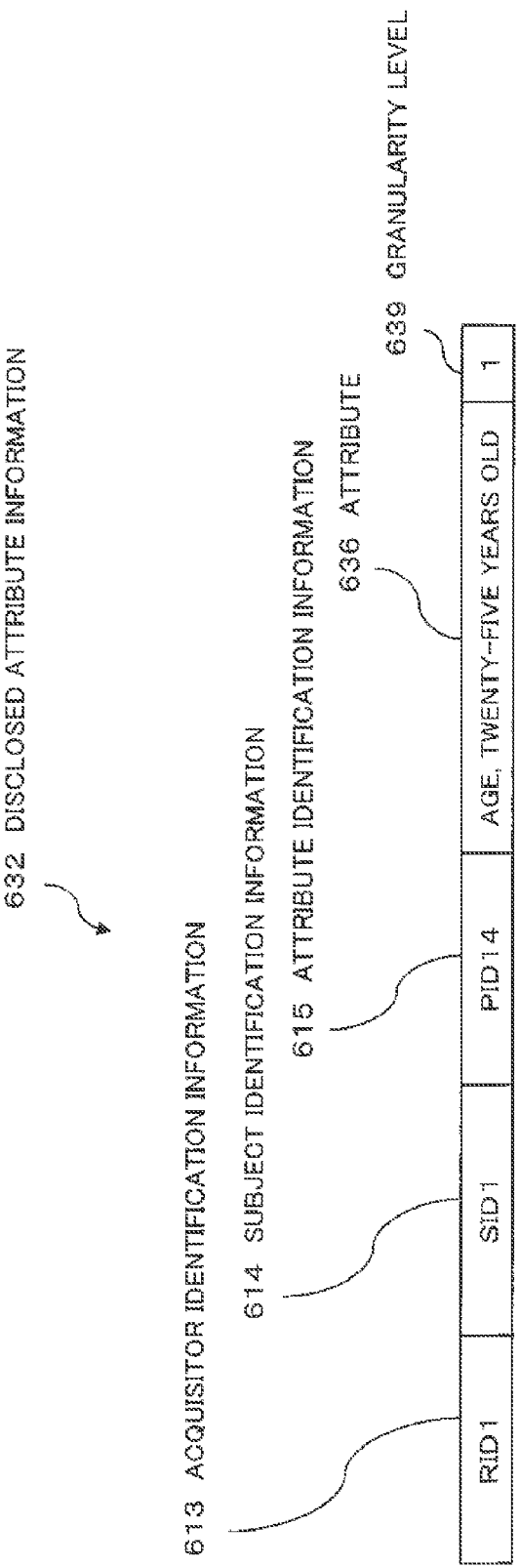
FIG. 19 is a diagram illustrating an example of disclosed attribute information in the fourth exemplary embodiment.

A received piece of disclosed attribute information 632 is a piece of disclosed attribute information 632 shown in FIG. 19. As shown in FIG. 19, as compared with the piece of disclosed attribute information 612 shown in FIG. 2, the piece of disclosed attribute information 632 is different in the respect that it further includes a granularity level 639.

The determination condition is, for example, such that a sum total of the granularity levels 349 included in the pieces of subject matched attribute information is larger than or equal to a predetermined threshold value. This threshold value is, for example, '6'.

The protection processing is, as the piece of response information, for example, any one of transmitting of a processed attribute resulting from roughening the granularity level of a relevant attribute value and transmitting of the provision disapproval notification.

The definition of the granularity level is the same as that of the second exemplary embodiment. The above are included in the assumption.

Figure 21:
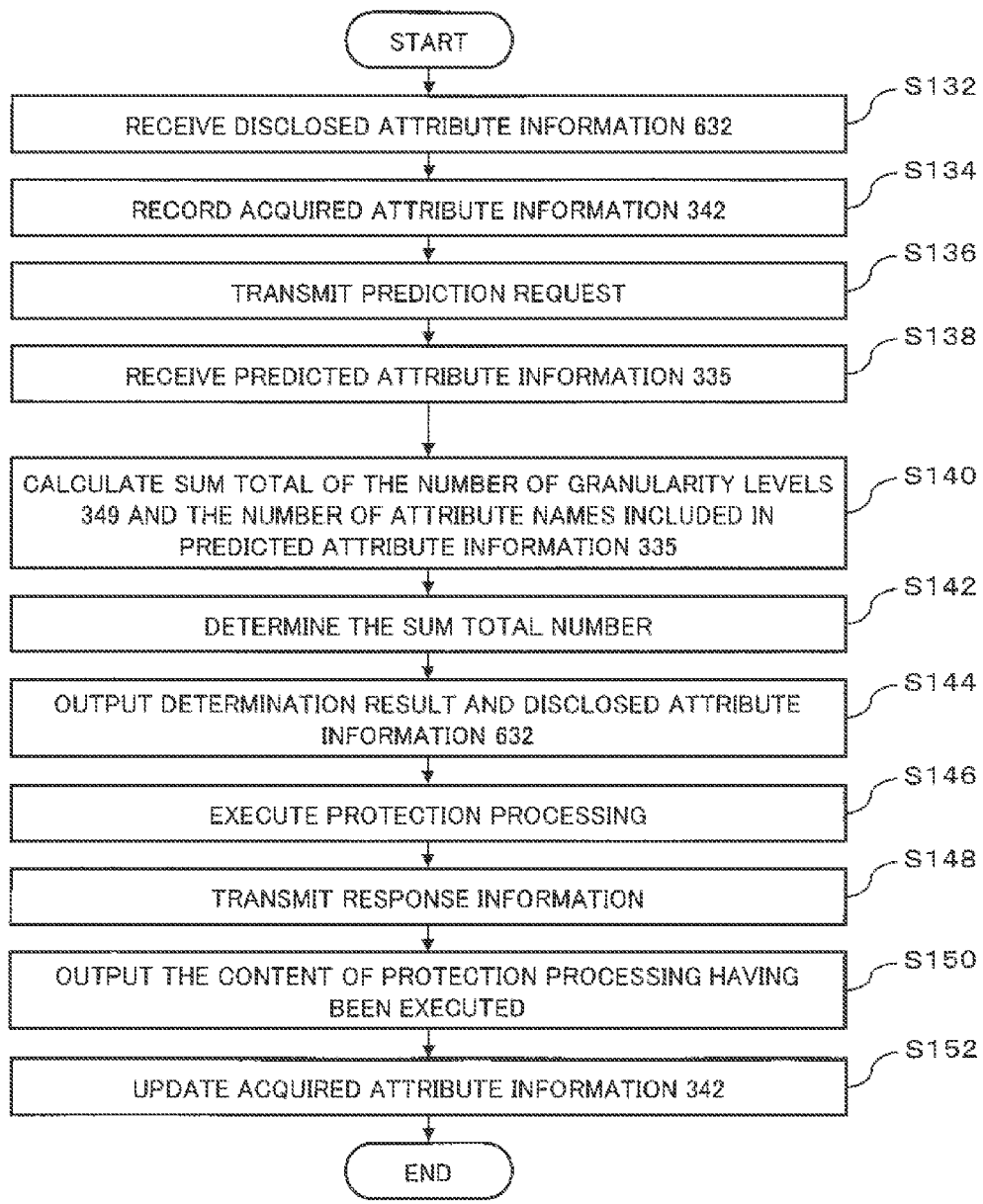
FIG. 21 is a flowchart illustrating operation of an information monitoring apparatus in the fourth exemplary embodiment.

FIG. 21 is a flowchart illustrating operation of the information monitoring apparatus 310 in this exemplary embodiment.

First, the attribute synthetic information determination unit 320 receives the piece of disclosed attribute information 632 (S132).

Next, the attribute synthetic information determination unit 320 records the received piece of disclosed attribute information 632 into the acquired attribute information table 341 as the piece of acquired attribute information 342 (S134). In addition, through this processing, the received piece of disclosed attribute information 632 is stored into the acquired attribute information storage unit 140 as one of the pieces of acquired attribute information 342, and the pieces of subject matched attribute information corresponding thereto are in the state where they include the piece of disclosed attribute information 632.

Next, the attribute synthetic information determination unit 320 transmits a prediction request including the piece of disclosed attribute information 632 to the acquisition prediction unit 330 (S136).

Next, the acquisition prediction unit 330 creates the piece of predicted attribute information 335 on the basis of the received prediction request by referring to the acquired attribute information table 341, and outputs the created piece of predicted attribute information 335 to the attribute synthetic information determination unit 320 (S138).

Next, the attribute synthetic information determination unit 320 calculates a sum total of the number of granularity levels 349 included in specific ones of the pieces of the acquired attribute information 342 and the number of attribute names included in the piece of predicted attribute information 335 (S140). Here, the specific ones of the pieces of acquired attribute information 342 are one or more pieces of acquired attribute information 342 which are the pieces of subject matched attribute information having been acquired by searching the acquired attribute information table 341 on the basis of the received piece of disclosed attribute information 632. According to the assumption for this description, the calculated sum total number is '6.5'. In addition, in the case where the calculated sum total number is less than '6', the determination results in that 'the determination condition is not satisfied'.

Next, the attribute synthetic information determination unit 320 determines whether or not the calculated sum total number is more than or equal to the threshold value '6' (S142). According to the assumption for this description, the determination results in that 'the determination condition is satisfied'.

Next, the attribute synthetic information determination unit 320 outputs the determination result and the piece of disclosed attribute information 632 to the protection processing execution unit 160 (S144).

Next, the protection processing execution unit 160 performs protection processing thereon (S146). Specifically, in the case where the received determination result is such that 'the determination condition is not satisfied', the protection processing execution unit 160 creates any one of the provision disapproval notification and a processed attribute resulting from roughening the granularity level of an attribute value of an attribute 636 included in the received piece of attribute information 632. In addition in the case where the received determination result is such that 'the determination condition is not satisfied', the protection processing execution unit 160 does not any protection processing thereon. According to the assumption for this description, the protection processing execution unit 160 creates a processed attribute by processing the attribute name 'twenty-five years old' into 'twenties'. The granularity level of this processed attribute is '0.5'.

Next, the protection processing execution unit 160 transmits the piece of response information including the processed attribute (S148). Specific operation thereof is the same as the operation in step S116 having been described in the first exemplary embodiment.

Next, the protection processing execution unit 160 outputs the content of protection processing having been executed to the attribute synthetic information determination unit 320 (S150). The content of protection processing having been executed is such that 'a processed attribute resulting from roughening the granularity level of a relevant attribute value into '0.5' has been transmitted as the piece of response information.

Next, the attribute synthetic information determination unit 320 updates the piece of acquired attribute information 342 corresponding to the piece of disclosed attribute information 632 on the basis of the received content of protection processing having been executed (S152). The attribute synthetic information determination unit 320 updates an attribute name 'twenty-five years old' of an attribute 346 included in the piece of acquired attribute information 342 corresponding to the piece of disclosed attribute information 632 into 'twenties', and updates the granularity level 349 from '1' to '0.5'.

With the above operation, the description of the operation based on the above assumption ends.

As a modification example of this exemplary embodiment, the protection processing execution unit 160 may be configured so as to possess information which indicates a relative importance degree of an attribute. In this case, the protection processing execution unit 160 may be configured so as to create the piece of response information on the basis of the importance degree of an attribute. For example, with respect to an attribute of a high importance, the protection processing execution unit 160 may create the piece of response information including the attribute, and with respect to an attribute of a low importance, the protection processing execution unit 160 may create the piece of response information including a disclosure disapproval notification.

In addition, in this exemplary embodiment, configuration may be made such that, on the basis of the first to fourth assumptions having been described in the first exemplary embodiment, the attribute synthetic information determination unit 320 makes a determination including the piece of predicted attribute information 335, and the protection processing execution unit 160 performs the protection processing corresponding thereto. These operations can be easily presumed by referring to the description of operation of the first exemplary embodiment and the description of operation of this exemplary embodiment, and thus, detailed description thereof is omitted here.

Further, the acquisition prediction unit 330 having been described in this exemplary embodiment may be configured so as to be applied to the information monitoring apparatus 210 of the second exemplary embodiment.

A first advantageous effect of this exemplary embodiment described above is that, in addition to the advantageous effect of the first exemplary embodiment, it is made possible for the acquisition apparatus 630 to effectively acquire a relevant attribute.

A reason for this is that configuration has been made such that the acquisition prediction unit 330 creates the piece of predicted attribute information 335, and the attribute synthetic information determination unit 320 determines the piece of attribute synthetic information on the basis of the piece of predicted attribute information 335.

That is, this is because configuration has been made such that it is made possible to retain a large number of attributes to be acquired by roughening a relevant granularity level in advance. Further, this is because configuration has been made such that attributes of a relatively low importance are not disclosed.

<Fifth Exemplary Embodiment>

Next, a fifth exemplary embodiment will be described in detail with reference to drawings. Hereinafter, description of contents duplicated with those having been described above will be omitted within a scope in which description of this exemplary embodiment does not become unclear.

Figure 22:
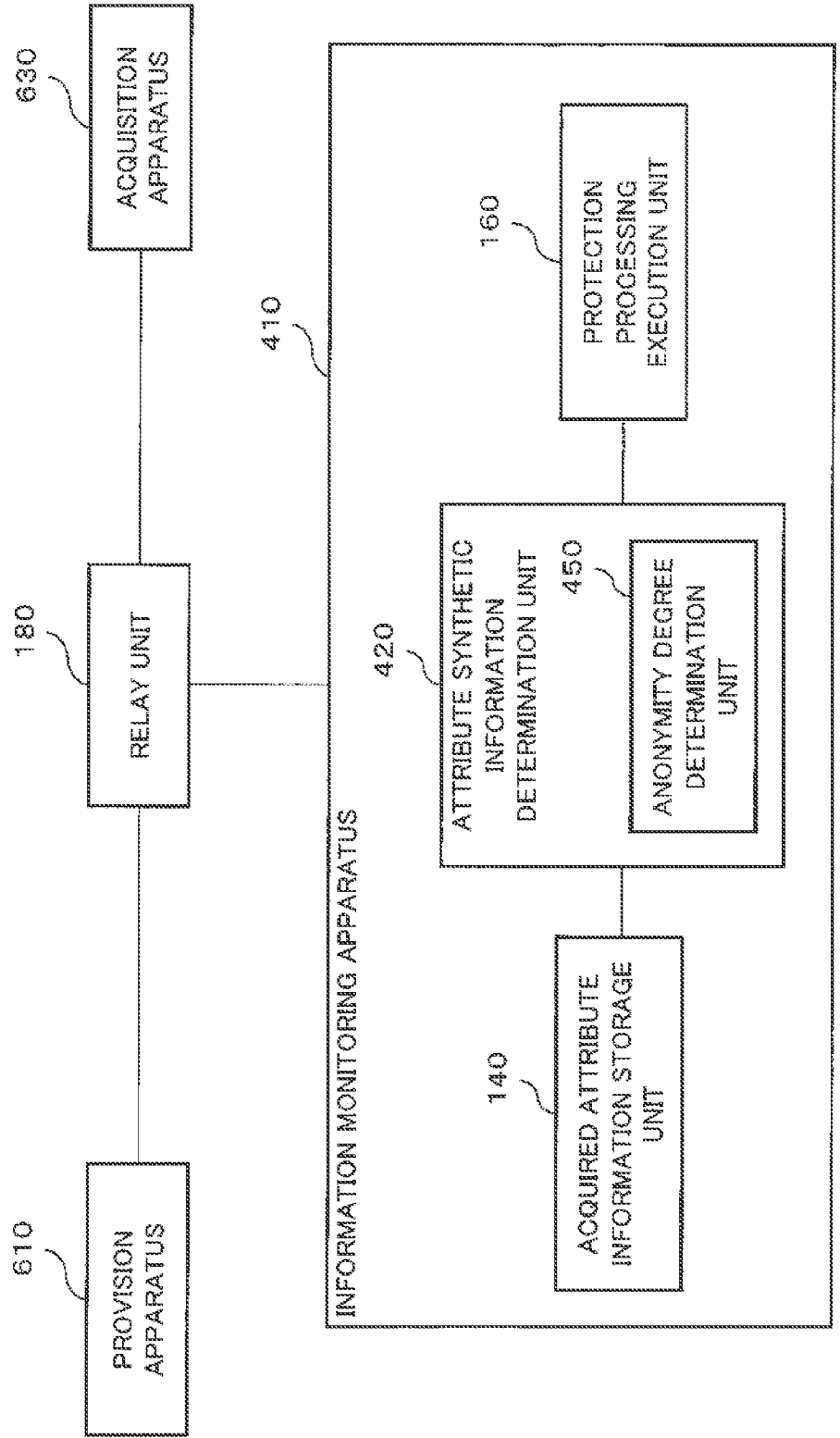
FIG. 22 is a block diagram illustrating a configuration of a fifth exemplary embodiment.

FIG. 22 is a block diagram illustrating a configuration of this exemplary embodiment.

Referring to FIG. 22, this exemplary embodiment includes the provision apparatus 610, the acquisition apparatus 630, the relay unit 180 and an information monitoring apparatus 410. The information monitoring apparatus 410 and the relay unit 180 are connected to each other via a network which is not illustrated.

The provision apparatus 610, the acquisition apparatus 630 and the relay unit 180 are the same components as those of the first exemplary embodiment.

As compared with the information monitoring apparatus 110 of the first exemplary embodiment, the information monitoring apparatus 410 of this exemplary embodiment includes an attribute synthetic information determination unit 420 as a substitute for the attribute synthetic information determination unit 120.

The attribute synthetic information determination unit 420 includes an anonymity degree determination unit 450.

The anonymity degree determination unit 450 determines the piece of attribute synthetic information by handling a lower limit value of an anonymity degree, which indicates a degree of anonymity regarding a subject, as a determination condition.

Figure 23:
FIG. 23 is a diagram illustrating an example of an anonymity degree information table in the fifth exemplary embodiment.

The anonymity degree determination unit 450 refers to, for example, an anonymity degree information table 451 shown in FIG. 23, and thereby acquires the anonymity degree on the basis of the pieces of acquired attribute information 142 and the piece of disclosed attribute information 612. In addition, the anonymity degree information table 451 is stored in a storage unit (not illustrated) of the anonymity degree determination unit 450. Further, for example, the anonymity degree information table 451 may be configured so as to refer to the anonymity degree information table 451 stored in an external apparatus (not illustrated) via an interface (not illustrated).

FIG. 23 is a diagram illustrating an example of the anonymity degree information table 451. As shown in FIG. 23, the anonymity degree information table 451 includes one or more pieces of anonymity degree information 452 each including an attribute name group 453 and an anonymity degree 454. The attribute name group 453 includes one or more attribute names. The anonymity degree 454 is a predicted value of the number of persons who are narrowed down as candidates for a subject on the basis of attribute values corresponding to the respective attribute names which are included in the attribute name group 453 corresponding to the anonymity degree 454.

For example, a first row of the anonymity degree information table 451 indicates that the acquisition apparatus 630, which has acquired respective attribute values corresponding to gender, a current location and occupation, can narrow candidates for a subject having these attributes down to two persons.

An example of specific operation will be described below in detail. As an assumption, it is assumed that the acquired attribute information table 141 is in the state shown in FIG. 6, and the piece of disclosed attribute information 612 shown in FIG. 5 has been received. Further, a lower limit value of an anonymity degree which is handled as the determination condition is assumed to be '2'.

First, the anonymity degree determination unit 450 acquires attribute names 'age', 'a current location', 'occupation' and 'gender' from the pieces of the acquired attribute information 142 and the piece of the disclosed attribute information 612.

Next, the anonymity degree determination unit 450 searches the anonymity degree information table 451 on the basis of the acquired attribute names. In this case, the anonymity degree determination unit 450 detects a matched attribute name group 453 in a fourth row of the anonymity degree information table 451. Subsequently, the anonymity degree determination unit 450 acquires an anonymity degree 454 '1' corresponding to the detected attribute name group 453.

In addition, in the case where the matched attribute name group 453 cannot be detected, the anonymity degree determination unit 450 operates so that, while changing the combination of the attribute names used for search keys by alternately deleting each of the attribute names, it can acquire an anonymity degree 454 which corresponds to one of the changed combinations and has the smallest value.

Next, the anonymity degree determination unit 450 compares the acquired anonymity degree 454 with a lower limit value regarding the anonymity degree, which is handled as the determination condition, and thereby makes a determination. In this case, since the lower limit is '2', the anonymity degree determination unit 450 determines that 'the determination condition is satisfied'.

Operation of this exemplary embodiment is equal to that of the first exemplary embodiment except the above-described operation of the anonymity degree determination unit 450, and thus further detailed description is omitted here.

In addition, the anonymity degree determination unit 450 may be configured so as to, for example, through a reference to an actual data distribution regarding a relevant attribute, which is indicated by a means (not illustrated), acquire the anonymity degree on the basis of the pieces of acquired attribute information 142 and the piece of disclosed attribute information 612.

Further, the acquisition prediction unit 330 of the fourth exemplary embodiment may be applied to this exemplary embodiment. In this case, the anonymity degree determination unit 450 may be configured so as to acquire the anonymity degree on the basis of the pieces of acquired attribute information 142, the piece of disclosed attribute information 612 and the piece of the predicted attribute information 335 having been described in the fourth exemplary embodiment.

Moreover, the number of attribute determination unit 121, the number of attribute kind determination unit 122 and the number of attribute disclosure determination unit 123 which have been described in the first exemplary embodiment may be applied to this exemplary embodiment.

Further, the anonymity degree determination unit 450 having been described in this exemplary embodiment may be applied to the information monitoring apparatus 210 of the second exemplary embodiment.

An advantageous effect of this exemplary embodiment described above is that, in addition to the advantageous effect of the first exemplary embodiment, it is made possible to prevent a person (a subject) from being identified by a disclosure requester for the purpose of an unfair use thereof.

A reason for this is that the anonymity degree determination unit 450 has been configured so as to determine the piece of attribute synthetic information by handling the anonymity degree as a determination condition.

<Sixth Exemplary Embodiment>

Next, a sixth exemplary embodiment will be described in detail with reference to drawings. Hereinafter, description of contents duplicated with those having been described above will be omitted within a scope in which description of this exemplary embodiment does not become unclear.

Figure 24:
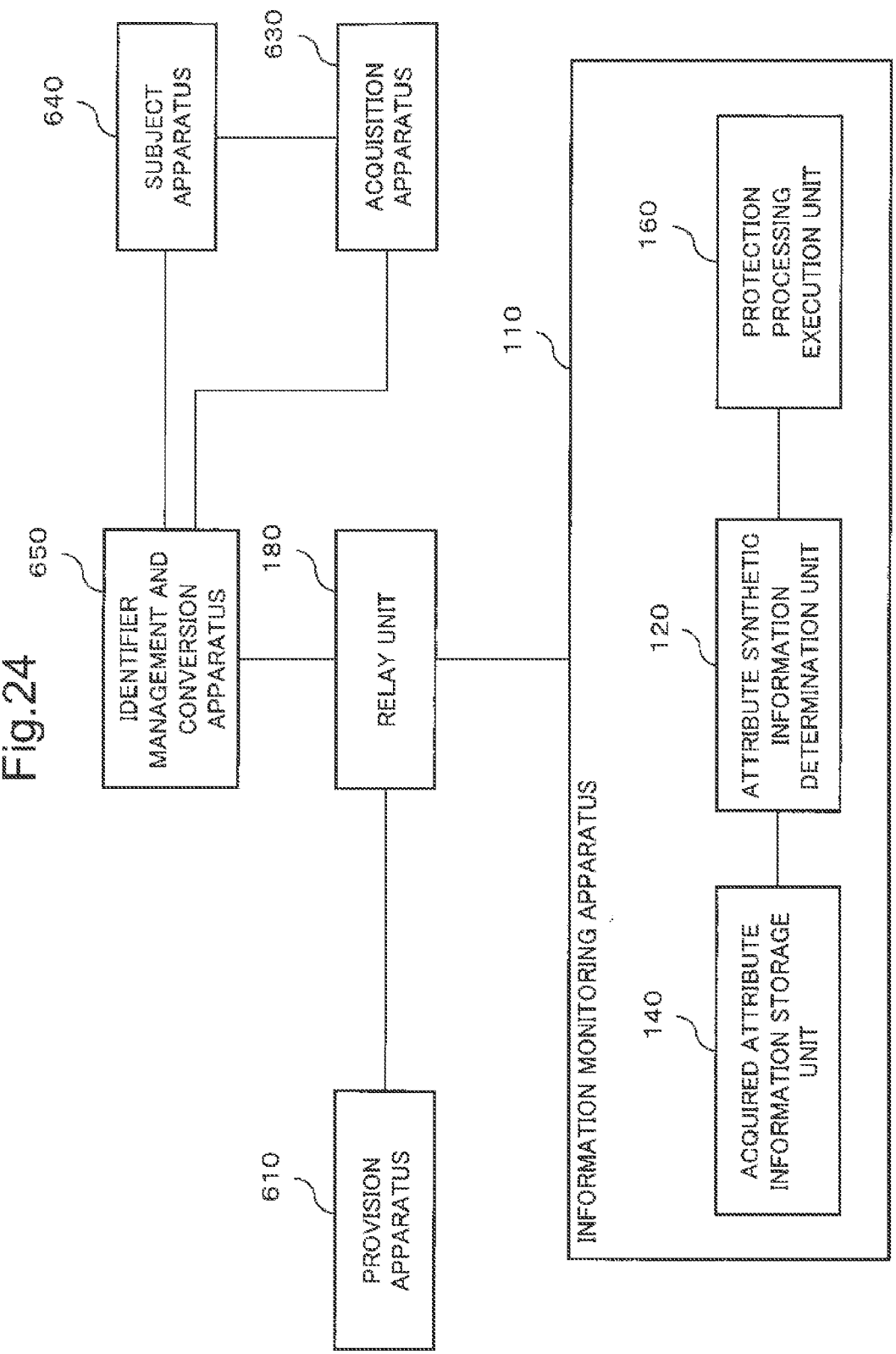
FIG. 24 is a block diagram illustrating a configuration of a sixth exemplary embodiment.

FIG. 24 is a block diagram illustrating a configuration of this exemplary embodiment.

Referring to FIG. 24, in a configuration of this exemplary embodiment, as compared with the configuration of the first exemplary embodiment, a subject apparatus 640 and an identifier management and conversion unit 650 are added.

The acquisition apparatus 630 and the subject apparatus 640 are connected to each other via a network which is not illustrated. Further, the subject apparatus 640 and the identifier management and conversion unit 650 are connected to each other via a network which is not illustrated. Moreover, the identifier management and conversion unit 650 and the relay unit 180 are connected to each other via a network which is not illustrated. Furthermore, the acquisition apparatus 630 and the subject apparatus 640 are connected to each other via a network which is not illustrated. In addition, with respect to each of the subject apparatus 640 and the identifier management and conversion unit 650, there may exist an arbitrary number of apparatuses.

The subject apparatus 640 receives services from the acquisition apparatus 630. The subject apparatus 640 notifies the identifier management and conversion unit 650 of an identifier for use in reception of a service from the acquisition apparatus 630. For example, the subject apparatus 640 logs into the acquisition apparatus 630 by using the identifier which has been notified thereto.

Further, when having received 'a warning which prompts the change of an identifier' described below, the subject apparatus 640 notifies the identifier management and conversion unit 650 of a new (changed) identifier for use in reception of a service from the acquisition apparatus 630.

The acquisition apparatus 630 transmits a disclosure request to the identifier management and conversion unit 650 by handling an identifier which the subject apparatus 640 has used for logging in as the piece of subject identification information 614.

The relay unit 180 transmits 'the warning which prompts the change of an identifier' having been received from the information monitoring apparatus 110 to the identifier management and conversion unit 650.

The identifier management and conversion unit 650 converts the piece of subject identification information 614 included in the attribute request having been received from the acquisition apparatus 630 into a piece of subject identification information 614 for the provision apparatus 610, and transmits the attribute request to the relay unit 180.

Further, the identifier management and conversion unit 650 converts a piece of subject identification information 614 included in the piece of response information having been received from the relay unit 180 into the piece of subject identification information 614 which was included in the attribute request having been received from the acquisition apparatus 630, and transmits the piece of response information to the acquisition apparatus 630.

As a modification example of this exemplary embodiment, the above-described functions of the subject apparatus 640, the acquisition apparatus 630 and the identifier management and conversion unit 650 may be realized by identifier (ID) management and cooperation functions, such as open identity (OpenID) or liberty-identity federation framework (Liberty-IDFF).

In such case, a procedure for login and a method for notifying an identifier are different depending on a utilized ID management and cooperation function.

Figure 25:
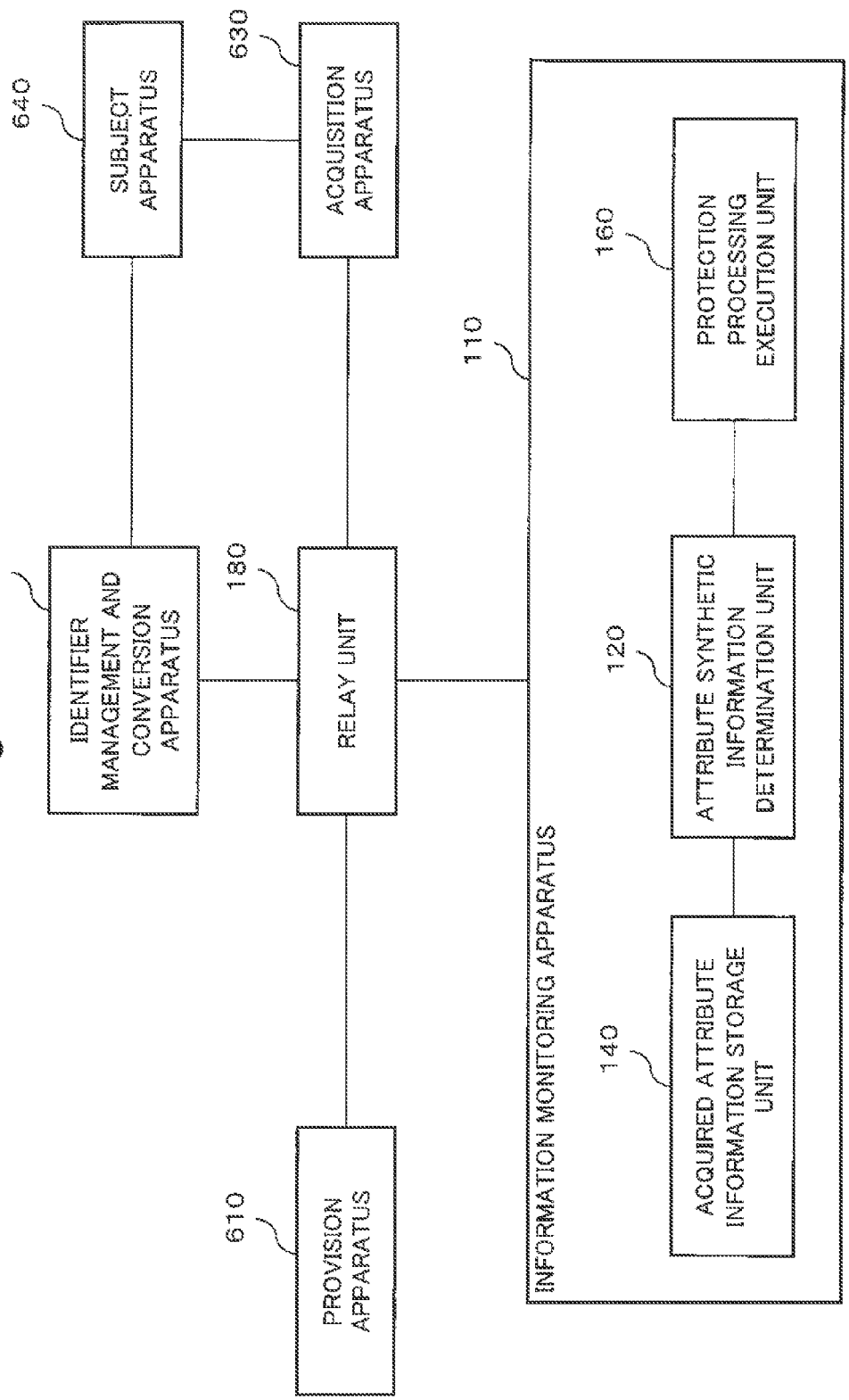
FIG. 25 is a block diagram illustrating a configuration of a modification example of the sixth exemplary embodiment.

FIG. 25 is a diagram illustrating a modification example of this exemplary embodiment. As shown in FIG. 25, in the modification example of this exemplary embodiment, the acquisition apparatus 630 directly transmits a disclosure request to the relay unit 180 not via the identifier management and conversion unit 650.

In addition, the OpenID and the Liberty-IDFF are well-known technologies for those skilled in the art, and thus, detailed description of operation thereof is omitted here.

The protection processing execution unit 160 of the information monitoring apparatus 110 transmits 'the warning which prompts the change of an identifier' for the subject apparatus 640 to the relay unit 180 on the basis of a determination result outputted by the attribute synthetic information determination unit 120.

The relay unit 180 transmits the received piece of response information to the identifier management and conversion unit 650.

In addition, the identifier management and conversion unit 650 may be configured so as to include the relay unit 180. Inversely, the relay unit 180 may be configured so as to include the identifier management and conversion unit 650.

Further, the function of this exemplary embodiment may be applied to the second exemplary embodiment. In this case, the identifier management and conversion unit 650 is connected to the provision apparatus 610.

An advantageous effect of this exemplary embodiment described above is that, in addition to the advantageous effect of the first exemplary embodiment, it is made possible to prevent personal information from being acquired for the purpose of an unfair use, and at the same time, allow the subject apparatus 640 to continue to receive services from the acquisition apparatus 630.

A reason for this is that configuration has been made such that the protection processing execution unit 160 transmits 'the warning which prompts the change of an identifier" to the subject apparatus 640 on the basis of a determination result having been made by the attribute synthetic information determination unit 120.

<Seventh Exemplary Embodiment>

Next, a seventh exemplary embodiment will be described in detail with reference to drawings. Hereinafter, description of contents duplicated with those having been described above will be omitted within a scope in which description of this exemplary embodiment does not become unclear.

FIG. 26 is a block diagram illustrating a configuration of this exemplary embodiment. As shown in FIG. 26, the information monitoring apparatus 110 of this exemplary embodiment includes the attribute synthetic information determination unit 120, the protection processing execution unit 160 and the acquired attribute information storage unit 140.

The acquired attribute information storage unit 140 stores therein the pieces of acquired attribute information 142 corresponding to respective one or more acquired attributes which have already been acquired by an acquisitor attempting to acquire a relevant attribute.

The attribute synthetic information determination unit 120 determines, on the basis of the pieces of acquired attribute information 142 and the specific piece of disclosed attribute information 612, whether or not the piece of attribute synthetic information, which is obtained by synthesizing the acquired attributes and the disclosed attribute, satisfies each of one or more predetermined determination conditions. Subsequently, the attribute synthetic information determination unit 120 outputs the determination result to the protection processing execution unit 160. Here, the specific piece of disclosed attribute information 612 is a piece of disclosed attribute information 612 which corresponds to a disclosed attribute targeted for disclosure to an acquisitor which has already acquired at least one acquired attribute related to the disclosed attribute.

The protection processing execution unit 160 performs predetermined protection processing on the disclosed attribute on the basis of the determination result having been received from the attribute synthetic information determination unit 120.

The information monitoring apparatus 110 may be an information monitoring apparatus 700 constituted by a general-purpose computer shown in FIG. 27.

FIG. 27 is block diagram illustrating a configuration of the information monitoring apparatus 700 in this exemplary embodiment, which causes a computer to execute predetermined processing by using a program.

Referring to FIG. 27, the information monitoring apparatus 700 includes a central processing unit (CPU) 710, a disk apparatus 720, a memory unit 730 and a communication unit 750.

The attribute synthetic information determination unit 120 and the protection processing execution unit 160 of the information monitoring apparatus 110 shown in FIG. 26 correspond to the CPU 710, the disk apparatus 720 and the memory unit 730 of the information monitoring apparatus 700. Further, the acquired attribute information storage unit 140 of the information monitoring apparatus 110 corresponds to the memory unit 730.

The CPU 710 develops a program stored in the disk apparatus 720 into, for example, the memory unit 730, and operates as the attribute synthetic information determination unit 120 and the protection processing execution unit 160 on the basis of the developed program.

In addition, configuration may be made such that a recording medium (or a storage medium) in which codes of the above-described program are recorded is supplied to the information monitoring apparatus 700, and the CPU 710 reads out and executes the codes of the program stored in the recording medium. Alternatively, configuration may be made such that the CPU 710 stores codes of the program having been stored in the recording medium into the disk apparatus 720.

That is, this exemplary embodiment also includes a recording medium 770 which temporarily or non-temporarily stores therein software (an information processing program) executed by each of the information monitoring apparatuses 110, 210, 310, 410 and 510 in the individual exemplary embodiments described above The recording medium which stores non-temporarily is also called a non-volatile storage medium.

The disk apparatus 720 stores the program therein.

The memory unit 730 stores the developed program therein.

The communication unit 750 is included in each of the attribute synthetic information determination unit 120 and the protection processing execution unit 160.

An advantageous effect of this exemplary embodiment described above is that it is made possible to prevent personal information from being acquired by a disclosure requester for the purpose of an unfair use thereof.

A reason for this is that configuration has been made such that the attribute synthetic information determination unit 120 determines the piece of attribute synthetic information on the basis of attributes an acquisitor has already acquired and an attribute the acquisitor is attempting to acquire, and the protection processing execution unit 160 performs protection processing on the attribute on the basis of the determination result.

In addition, the information monitoring apparatus of each of the exemplary embodiments 1 to 7 may be an information monitoring apparatus constituted by a general-purpose computer shown in FIG. 27 just like the information monitoring apparatus of the seventh exemplary embodiment.

Each component described in the above individual exemplary embodiments does not necessarily exist individually independently. For example, each component may be configured such that a plurality of components is realized as one module, and/or one component is realized by a plurality of modules. Further, each component may be configured such that a certain component is part of another component, and/or part of a certain component and part of another component are overlapped by each other.

Further, in the individual exemplary embodiments described above, although a plurality of operations is sequentially described in the form of a flowchart, the described order is not intended to limit order in which the plurality of operations is performed. Thus, when practicing the individual exemplary embodiments, order of the plurality of operations can be changed within a scope in which no contradiction occurs in the content of the plurality of operations.

Moreover, in the individual exemplary embodiments described above, a plurality of operations is not limited to be carried out with individually different timing. For example, during an execution of a certain operation, another operation may occur, and execution timing of a certain operation and execution timing of another operation may be overlapped by each other partially or entirely.

Moreover, in the individual exemplary embodiments described above, description is made such that a certain operation becomes a trigger of another operation, but the description is not intended to limit all relations between the certain operation and the another operation. Thus, when practicing the individual exemplary embodiments, relations among the plurality of operations can be changed within a scope in which no contradiction occurs in the content of the plurality of operations. Further, specific description of operations of respective components is not intended to limit the operations of respective components. Thus, specific operations of respective components may be changed within a scope in which no trouble occurs in aspects of functionality, performance and other characteristics when practicing the individual exemplary embodiments.

Although the present invention has been described with reference to the above exemplary embodiments, the present invention is not limited to these exemplary embodiments. Various changes which can be understood by those skilled in the art can be made on the configuration and the details of the present invention within the scope of the present invention.

This application is based upon and claims the benefit of priority from Japanese Patent Application No. 2011-066206, filed on Mar. 24, 2011, the disclosure of which is incorporated herein in its entirety by reference.

DESCRIPTION OF THE REFERENCE NUMERALS

110 Information monitoring apparatus
120 Attribute synthetic information determination unit
121 Number of attribute determination unit
122 Number of attribute kind determination unit
123 Number of attribute disclosure determination unit
140 Acquired attribute information storage unit
141 Acquired attribute information table
142 Acquired attribute information
143 acquisitor identification information
144 Subject identification information
145 Attribute identification information
146 Attribute
160 Protection processing execution unit
180 Relay unit
210 Information monitoring apparatus
220 Attribute synthetic information determination unit
241 Acquired attribute information table
242 Acquired attribute information
247 Attribute name
249 Granularity level
260 Protection processing execution unit
280 Relay unit
310 Information monitoring apparatus
320 Attribute synthetic information determination unit
330 Acquisition prediction unit
335 Predicted attribute information
341 Acquired attribute information table
342 Acquired attribute information
349 Granularity level
410 Information monitoring apparatus
420 Attribute synthetic information determination unit
450 Anonymity degree determination unit
451 Anonymity degree information table.
452 Anonymity degree information
453 Attribute name group
454 Anonymity degree
610 Provision apparatus
612 Disclosed attribute information
613 acquisitor identification information
614 Subject identification information
615 Attribute identification information 616 Attribute
622 Disclosed attribute information.
627 Attribute name
629 Granularity level
630 Acquisition apparatus
640 Subject apparatus
632 Disclosed attribute information
650 Identifier management and conversion unit
670 Provision apparatus
680 Disclosure control function unit
700 Information monitoring apparatus
710 CPU
720 Disk apparatus
730 Memory unit
750 Communication unit
770 Storage medium

The invention claimed is:

1. An information monitoring apparatus comprising:
acquired attribute information storage unit which stores therein at least one piece of acquired attribute information corresponding to at least one acquired attribute which has already been acquired by an acquisitor;
acquisition state determination unit which, on the basis of said at least one piece of acquired attribute information and a piece of disclosed attribute information corresponding to a disclosed attribute which represents a disclosed request to specify a requested target attribute and is a target for disclosure to said acquisitor, determines whether or not a piece of attribute synthetic information resulting from synthesizing said at least one acquired attribute and said disclosed attribute satisfies each of predetermined one or more determination conditions, and outputs a result of said determination; and
protection processing execution unit which executes predetermined protection processing on an attribute on the basis of said result of said determination.

2. The information monitoring apparatus according to claim 1, wherein each of said at least one piece of acquired attribute information includes a piece of subject identification information which identifies a subject possessing said attribute corresponding thereto, and said attribute is an attribute of said subject.

3. The information monitoring apparatus according to claim 2, wherein said acquisition state determination unit at least includes anonymity degree determination unit which makes said determination by handling a lower limit value of an anonymity degree which indicates a degree of anonymity of said subject as one of said one or more determination conditions.

4. The information monitoring apparatus according to claim 3, wherein, in the case where said acquisition state determination unit determines that each of said one or more determination conditions is satisfied, said protection processing execution unit transmits a warning which prompts said subject to change said piece of subject identification information.

5. The information monitoring apparatus according to claim 3, further comprising acquisition prediction unit which predicts a kind of predicted attribute, which is likely to be disclosed to said acquire in future on the basis of said at least one piece of acquired attribute information and said piece of disclosed attribute information, and outputs a piece of predicted attribute information including a piece of identification information which indicates said predicted kind,
wherein, on the basis of said piece of predicted attribute information, said at least one piece of acquired attribute information and said piece of disclosed attribute information, said acquisition state determination unit determines whether or not a piece of attribute synthetic information resulting from synthesizing said at least one acquired attribute, said disclosed attribute and said prediction attribute satisfies each of one or more predetermined determination conditions, and outputs a result of said determination.

6. The information monitoring apparatus according to claim 2, wherein, in the case where said acquisition state determination unit determines that each of said one or more determination conditions is satisfied, said protection processing execution unit transmits a warning which prompts said subject to change said piece of subject identification information.

7. The information monitoring apparatus according to claim 2, further comprising acquisition prediction unit which predicts a kind of predicted attribute, which is likely to be disclosed to said acquire in future on the basis of said at least one piece of acquired attribute information and said piece of disclosed attribute information, and outputs a piece of predicted attribute information including a piece of identification information which indicates said predicted kind,
wherein, on the basis of said piece of predicted attribute information, said at least one piece of acquired attribute information and said piece of disclosed attribute information, said acquisition state determination unit determines whether or not a piece of attribute synthetic information resulting from synthesizing said at least one acquired attribute, said disclosed attribute and said prediction attribute satisfies each of one or more predetermined determination conditions, and outputs a result of said determination.

8. The information monitoring apparatus according to claim 1, further comprising acquisition prediction unit which predicts a kind of predicted attribute, which is likely to be disclosed to said acquire in future on the basis of said at least one piece of acquired attribute information and said piece of disclosed attribute information, and outputs a piece of predicted attribute information including a piece of identification information which indicates said predicted kind,
wherein, on the basis of said piece of predicted attribute information, said at least one piece of acquired attribute information and said piece of disclosed attribute information, said acquisition state determination unit determines whether or not a piece of attribute synthetic information resulting from synthesizing said at least one acquired attribute, said disclosed attribute and said prediction attribute satisfies each of one or more predetermined determination conditions, and outputs a result of said determination.

9. The information monitoring apparatus according to claim 1, wherein each of said at least one piece of acquired attribute information and said piece of disclosed attribute information further includes a granularity level of an attribute value.

10. The information monitoring apparatus according to claim 1, wherein said acquisition state determination unit at least includes number of attribute determination unit which makes said determination by handling an upper limit value of the number of said attribute as one of said one or more determination conditions.

11. The information monitoring apparatus according to claim 1, wherein said acquisition state determination unit at least includes number of attribute kind determination unit which makes said determination by handling an upper limit value of the number of at least one kind of said attribute as one of said one or more determination conditions.

12. The information monitoring apparatus according to claim 1, wherein said acquisition state determination unit at least includes number of attribute disclosure determination unit which makes said determination by handling an upper limit value of the number of at least one disclosure of said attribute as one of said one or more determination conditions.

13. An information monitoring method for use in an information monitoring apparatus including storage means, the information monitoring method comprising:
- storing, in said storage means, at least one piece of acquired attribute information corresponding to at least one acquired attribute which has already been acquired by an acquisitor;
- on the basis of said at least one piece of acquired attribute information and a piece of disclosed attribute information corresponding to a disclosed attribute which represents a disclosed request to specify a requested target attribute and is a target for disclosure to said acquisitor, determining whether or not a piece of attribute synthetic information resulting from synthesizing said at least one acquired attribute and said disclosed attribute satisfies each of predetermined one or more determination conditions, and outputting a result of said determination; and
- executing predetermined protection processing on an attribute on the basis of said result of said determination.

14. A non- transitory computer-readable recording medium for recording a program which causes a computer including storage means to execute comprising the processes of:
- storing, in said storage means, at least one piece of acquired attribute information corresponding to at least one acquired attribute which has already been acquired by an acquisitor;
- on the basis of said at least one piece of acquired attribute information and a piece of disclosed attribute information corresponding to a disclosed attribute represents a disclosed request to specify a requested target attribute and which is a target for disclosure to said acquisitor, determining whether or not a piece of attribute synthetic information resulting from synthesizing said at least one acquired attribute and said disclosed attribute satisfies each of predetermined one or more determination conditions, and outputting a result of said determination; and
- executing predetermined protection processing on an attribute on the basis of said result of said determination.

15. An information monitoring apparatus comprising:
- acquired attribute information storage means for storing therein at least one piece of acquired attribute information corresponding to at least one acquired attribute which has already been acquired by an acquisitor;
- acquisition state determination means for, on the basis of said at least one piece of acquired attribute information and a piece of disclosed attribute information corresponding to a disclosed attribute which represents a disclosed request to specify a requested target attribute and is a target for disclosure to said acquisitor, determining whether or not apiece of attribute synthetic information resulting from synthesizing said at least one acquired attribute and said disclosed attribute satisfies each of predetermined one or more determination conditions, and outputting a result of said determination; and
- protection processing execution means for executing predetermined protection processing on an attribute on the basis of said result of said determination.

* * * * *